United States Patent
Yoon et al.

(10) Patent No.: US 12,486,495 B2
(45) Date of Patent: Dec. 2, 2025

(54) CARDIAC ORGANOID, MANUFACTURING METHOD THEREFOR, AND METHOD FOR EVALUATING DRUG TOXICITY BY USING SAME

(71) Applicant: INDUSTRY-ACADEMIC COOPERATION FOUNDATION, YONSEI UNIVERSITY, Seoul (KR)

(72) Inventors: Young Sup Yoon, Seoul (KR); Jae Yeaon Cho, Goyang-si (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 713 days.

(21) Appl. No.: 17/906,679

(22) PCT Filed: Feb. 17, 2021

(86) PCT No.: PCT/KR2021/002042
§ 371 (c)(1),
(2) Date: Sep. 19, 2022

(87) PCT Pub. No.: WO2021/187758
PCT Pub. Date: Sep. 23, 2021

(65) Prior Publication Data
US 2023/0212525 A1 Jul. 6, 2023

(30) Foreign Application Priority Data
Mar. 19, 2020 (KR) .................. 10-2020-0033773

(51) Int. Cl.
*C12N 5/071* (2010.01)
*C12N 5/077* (2010.01)
*C12N 5/0793* (2010.01)

(52) U.S. Cl.
CPC ......... *C12N 5/0697* (2013.01); *C12N 5/0619* (2013.01); *C12N 5/0657* (2013.01);
(Continued)

(58) Field of Classification Search
CPC .................................................. A61K 39/023
See application file for complete search history.

(56) References Cited

U.S. PATENT DOCUMENTS

2018/0273904 A1* 9/2018 Skardal .................. C12M 21/08

FOREIGN PATENT DOCUMENTS

| KR | 1020180038573 A | 4/2018 |
| KR | 1020190040317 A | 4/2019 |
| WO | 2015040142 A1 | 3/2015 |
| WO | 2017059171 A1 | 4/2017 |
| WO | 2019066059 A1 | 4/2019 |

(Continued)

OTHER PUBLICATIONS

Li, 2018, Biomaterials, vol. 163, pp. 116-127. (Year: 2018).*
(Continued)

*Primary Examiner* — Mark L Shibuya
(74) *Attorney, Agent, or Firm* — AEON Law, PLLC; Adam L.K. Philipp; Charlotte E. Holoubek

(57) ABSTRACT

The present specification provides a spontaneous-contracting cardiac organoid, a method for manufacturing the organoid, and a method for evaluating drug toxicity by using same, the cardiac organoid comprising: a chamber in which a fluid is stored; a first pipe connected to the chamber so that the fluid flows therethrough; a second pipe connected to the chamber so that the fluid is discharged therethrough; and a valve formed on the first pipe so as to spontaneously open/close an inflow pipe.

17 Claims, 22 Drawing Sheets

(52) U.S. Cl.
CPC .... *C12N 2501/155* (2013.01); *C12N 2501/16* (2013.01); *C12N 2501/415* (2013.01); *C12N 2506/45* (2013.01); *C12N 2513/00* (2013.01); *C12N 2533/90* (2013.01)

(56) References Cited

FOREIGN PATENT DOCUMENTS

| WO | WO-2019174879 A1 * | 9/2019 | ............ C12N 5/0656 |
| WO | 2019244044 A1 | 12/2019 | |
| WO | 2020014212 A1 | 1/2020 | |

OTHER PUBLICATIONS

Lika Drakhlis et al., "Human heart-forming organoids recapitulate early heart and foregut development", Nature Biotechnology, vol. 39, 2021, 50 pages.

Ronald A. Li et al., "Bioengineering an electro-mechanically functional miniature ventricular heart chamber from human pluripotent stem cells", Biomaterials, vol. 163, 2018, pp. 116-127.

Jaeyeaon Cho et al., "From engineered heart tissue to cardiac organoid", Theranostics, vol. 12, Issue 6, 2022, pp. 2758-2772.

Jiyoung Lee et al., "In vitro generation of functional murine heart organoids viaFGF4 and extracellular matrix", Nature Communications, vol. 11, Article 4283, 2020, 52 pages.

Plansky Hoang et al., "Generation of spatial-patterned early-developing cardiac organoids using human pluripotent stem cells", Nature Protocols, vol. 13, Issue 4, 2018, pp. 723-737.

International Search Report and Written Opinion received for PCT Patent Application No. PCT/KR2021/002042 dated May 28, 2021, 15 pages (4 pages of English Translation and 11 pages of Official copy).

Mills et al., "Drug Screening in Human PSC-Cardiac Organoids Identifies Pro-proliferative Compounds Acting via the Mevalonate Pathway", Cell Stem Cell, vol. 24, No. 6, 2019, pp. 895-907.

* cited by examiner (a)

(b)

CARDIAC ORGANOID, MANUFACTURING METHOD THEREFOR, AND METHOD FOR EVALUATING DRUG TOXICITY BY USING SAME

RELATED APPLICATIONS

This application is a national entry of PCT International Patent Application No. PCT/KR2021/002042, filed Feb. 17, 2021, which claims the benefit of priority of Korean Patent Application Serial No. 10-2020-0033773, filed Mar. 19, 2020. The entire contents of the above-referenced applications and of all priority documents referenced in the Application Data Sheet filed herewith are hereby incorporated by reference for all purposes.

TECHNICAL FIELD

The present disclosure relates to a cardiac organoid capable of spontaneous-contracting, and more particularly, to a cardiac organoid having a structure including ventricles, valves, and the like similar to a living heart and capable of spontaneous-contracting, a manufacturing method therefor, and a method for evaluating drug toxicity by using the same.

BACKGROUND ART

In the early stages of new drug development, there is a need for a model to evaluate exact toxicity and efficacy prediction. With current technology, animal models may most closely simulate the toxicity and efficacy of new drugs. However, animal experiments are burdensome in time and money, and it is difficult to fully reflect an in vivo environment of the human due to differences in genetic, biochemical and metabolic processes between species. In addition, it can be difficult to technically monitor processes happening inside animals and it may be ethically problematic.

Accordingly, although primary cultured cells which are directly isolated from human tissues and cultured in vitro are used as a standard model, it is difficult to obtain tissues, and there are experimental limitations in that tissue cells cannot proliferate in vitro. Furthermore, since a two-dimensional cell-based model (cell based in vitro model) is more efficient than the primary cultured cells derived from human tissues in terms of cost and labor, the model is widely used for evaluating drug toxicity and efficacy. However, the two-dimensional cell-based model is insufficient to realize the physiological function and tissue complexity resulting from cell-cell and cell-extracellular matrix interactions.

Meanwhile, organoids are attracting attention as a new biomimetic model. The organoids are formed into three-dimensional structures such as organs by growing stem cells into specific cells. Unlike the two-dimensional cell-based model, the organoids may be cultured in a three-dimensional environment and cultured for a longer period of time. In addition, the organoid is small in size, but constituent cells and structures thereof are similar to those of a real organ. Accordingly, the organoids have been evaluated as optimal specimens for examining the efficacy and stability of drugs in the process of developing new drugs. Furthermore, organoid-related fields have high potential to be used not only for evaluating the drug toxicity and efficacy of new drug development, but also for disease models, cancer research, personalized medicine, regenerative therapeutics, and the like.

To date, various organoids, such as stomach, intestine, early liver, thyroid, lung, brain, and the like have been successfully developed. However, cardiac organoids developed to date exhibit the characteristics of cardiomyocytes immature in electrophysiological characteristics and the like. In addition, there is a limit in that the cardiac organoids to date are not morphologically similar to the living heart. Since most cardiovascular diseases are developed after adulthood or aging, it is necessary to develop a cardiac organoid including mature cardiomyocytes that are morphologically and functionally similar to adult cardiomyocytes.

The background art of the disclosure has been prepared to more facilitate understanding of the present disclosure. It should not be understood that the matters described in the background art of the disclosure exist as prior arts.

DISCLOSURE

Technical Problem

Organoids may vary in organs and tissues to be formed according to the differentiation of stem cells. In vivo, an inner cell mass of blastocysts differentiates into endoderm, mesoderm and ectoderm, and the endoderm, the mesoderm and the ectoderm consequently form different organs and tissues, respectively.

The endoderm may be mainly differentiated into the digestive and respiratory organs, and the ectoderm may be differentiated into the epidermis, glandular tissue, sensory epithelium, and nervous system. Manufacturing methods for these endoderm and ectoderm-derived organs have already been established, and there are various organoids such as small intestine, lung, liver, and brain.

On the other hand, the mesoderm may be differentiated into mesenchyme, hematopoietic system, muscle, bone, kidney, reproductive tract and heart. Organs formed by the mesoderm are complex organs consisting of variously differentiated cells, and a three-dimensional arrangement of differentiated cells is functionally important. However, the cardiac organoids developed so far do not reach original performance and structures of a living body because cardiomyocytes differentiated from mesoderm are heterogeneous, ion channel structures are different, or sarcomere formation and arrangement are incomplete. Furthermore, the viability of the cardiomyocytes is very low in the process of removing the cardiomyocytes from a culture container in order to be cultured in a three-dimensional environment, so that it is very difficult to maintain the yield and growth. Accordingly, the development of cardiac organoids is difficult compared to other organoids.

Meanwhile, the inventors of the present disclosure have recognized that it is important to provide a suitable environment required for the differentiation of stem cells so that the desired differentiation of the stem cells may be made in order to obtain a cardiac organoid.

The inventors of the present disclosure have formed a cardiac organoid capable of spontaneous beating through a differentiation process such as the natural development of a living heart from pluripotent stem cells, and as a result, developed a cardiac organoid structurally and functionally similar to the heart.

Therefore, an object to be solved by the present disclosure is to provide a cardiac organoid having structures such as ventricles and valves similar to a living heart and capable of spontaneous-contracting even without electrical stimulation, and a manufacturing method thereof.

Further, another object to be solved by the present disclosure is to provide a method for evaluating efficacy and toxicity of a drug in the development of a new drug through the cardiac organoid described above.

The objects of the present disclosure are not limited to the aforementioned objects, and other objects, which are not mentioned above, will be apparent to those skilled in the art from the following description.

Technical Solution

In order to solve the object described above, according to an exemplary embodiment of the present disclosure, there is provided a manufacturing method of a cardiac organoid including a first culturing step of differentiating pluripotent stem cells (PSCs) into cardiomyocytes (CMs), a second culturing step of culturing the cardiomyocytes and an extracellular matrix (ECM) in a first maintenance medium so as to form a fusion tissue, and a third culturing step of culturing the fusion tissue in a second maintenance medium so as to form a cardiac organoid.

As used herein, the term "pluripotent stem cells" may refer to cells having the ability to differentiate into all cells constituting the body, and generally, may include induced pluripotent stem cells (iPSCs) and embryonic stem cells (ES cells) having a common characteristic of differentiating to pluripotency. More specifically, the embryonic stem cells are induced from the inner cell mass of blastocysts in a pre-implantation stage. The induced cells are maintained in a specific environment and are capable of unrestricted culture and pluripotent differentiation. Furthermore, the induced pluripotent stem cells may refer to pluripotent differentiated cells made by dedifferentiation from body somatic cells, and are formed by making somatic cells into a state very similar to embryonic stem cells through a process called reprogramming, such as cell fusion, nuclear substitution, and overexpression of pluripotency regulators. Furthermore, the pluripotent stem cells are not limited to the embryonic stem cells and the induced pluripotent stem cells, and may include cells having both pluripotent differentiation and self-replication ability. However, preferably, the pluripotent stem cells may be mammalian cells, more preferably human-derived pluripotent stem cells.

As used herein, the term "cardiomyocytes" refer to cells constituting the heart. The cardiomyocytes may be divided into atrial, ventricular and nodal cardiomyocytes according to a structure of the heart, and the cardiomyocytes may be mononuclear cells and may lose a function in the human body after birth. Therefore, the recovery of damaged cardiomyocytes may be difficult. On the other hand, the cardiomyocytes may be damaged or destroyed when exposed to stress such as cardiac infarction or myocarditis. Accordingly, the damage or destruction of the cardiomyocytes causes a decrease in a myocardial function, which may lead to heart disease. Therefore, in regenerative cell therapy for recovery of the cardiac function or treatment of the heart disease, cardiomyocytes differentiated from stem cells may be used.

As used herein, the term "organoid" refers to a small embryoid body that reproduces both the form and the function of a tissue or organ. More specifically, the organoid needs to include one or more cell types among various types of cells constituting the organ or tissue, and needs to be able to reproduce a specific function of each organ, and the cells need to be agglomerated with each other to be spatially organized in a form similar to the organ. The organoid is different from a spheroid in that the organoid forms a lineage rather than a simple aggregate of cells, and may be used for new-drug development, artificial organs, disease therapeutic agents, and patient-specific models for disease treatment.

According to a feature of the present disclosure, the first maintenance medium may not include insulin, but the second maintenance medium may include insulin. In this case, the insulin may be a factor that promotes cell proliferation by promoting absorption of sugar and amino acids into cells. However, as the insulin rather inhibits cell proliferation and induces cell differentiation depending on a condition, whether or not the insulin is included may be determined according to the purpose.

As used herein, the term "medium" refers to a mixture for the growth and proliferation of stem cells and the like in vitro, including essential elements for the cell growth and proliferation, such as sugars, amino acids, various nutrients, serum, growth factors, and minerals.

According to another feature of the present disclosure, the first culturing step may include inoculating pluripotent stem cells, maintaining the inoculated pluripotent stem cells in the first maintenance medium, culturing the pluripotent stem cells in an induction medium so that the pluripotent stem cells are induced into cardiac progenitors through a mesoderm cell stage, and culturing mesoderm cells in the first maintenance medium to differentiate the cardiac progenitors into mature cardiomyocytes.

According to yet another feature of the present disclosure, the induction medium may include at least one of the group consisting of IWR-1 endo, XAV-939, JW74, SEN461, ICG-001, LGK-974, IWP-2, IWP-4, Wnt-C59 and WIKI4. In this case, in various exemplary embodiments, IWR-1 endo may be used, and the concentration may be used in 10 UM or more, but is not limited thereto.

According to yet another feature of the present disclosure, the culturing of the pluripotent stem cells in the induction medium to be induced into the cardiac progenitors may be performed for at least one period of 5 to 7 days. In this case, 5 to 7 days may mean 5 to 7 days from a start date of the culture in the induction medium through the maintaining of the pluripotent stem cells.

According to yet another feature of the present disclosure, the culturing of the cardiac progenitors in the first maintenance medium may be performed for at least one period of 10 to 21 days. In this case, 10 to 21 days may mean 10 to 21 days from a start date of the culture in the induction medium through the maintaining of the pluripotent stem cells. Accordingly, the first culturing step of differentiating the pluripotent stem cells into the cardiomyocytes may be performed for at least one period of 10 to 21 days, and through the first culturing step, mature cardiomyocytes capable of spontaneously contracting may be formed.

According to yet another feature of the present disclosure, the extracellular matrix may be obtained from fibroblasts.

According to yet another feature of the present disclosure, the second culturing step may be performed for at least one period of 28 to 32 days.

According to yet another feature of the present disclosure, the third culturing step may include cutting the fusion tissue, and suspension-culturing the cut fusion tissue. At this time, the third culturing step may be performed for at least one period of 25 days to 3 years or less from a start date of the suspension-culturing, but is not limited thereto.

On the other hand, the cardiomyocytes developed to date have a short survival period of about 2 to 3 weeks after spontaneous contracting, without maintaining continuous survival and proliferation. Accordingly, two-dimensional immature cardiomyocytes cultured for about 2 to 3 weeks have been used for evaluating drug efficacy and toxicity.

Furthermore, in order to simulate more similarly to living organs, conventional three-dimensional spheroids and organoids developed from the cardiomyocytes do not undergo continuous contracting movement like two-dimensional cardiomyocytes, and thus, it is necessary to supply electrical stimulation. In addition, the cells inside the spheroids and the organoids cannot communicate with an external environment and thus die because nutrients are not supplied. These three-dimensional spheroids have a limitation in that the viability is not stable like the two-dimensional cardiomyocytes.

However, the cardiac organoid according to an exemplary embodiment of the present disclosure is highly organized and may perform continuous contraction without electrical stimulation, and when an appropriate medium is maintained, long-term growth is possible. More specifically, in the cardiac organoid according to an exemplary embodiment of the present disclosure, a ventricle that is morphologically similar to the heart, that is, a chamber which is hollow in the organoid to accommodate a fluid is formed. Accordingly, the cells in the organoid directly exchange nutrients through the medium, that is, the fluid accommodated in the chamber, and thus, the cells forming the cardiac organoid may grow while maintaining survival.

Therefore, the cardiac organoid according to an exemplary embodiment of the present disclosure has a more improved survival period than models that have been used for conventional drug efficacy and toxicity evaluation, and may form mature cardiac organoid and cardiomyocytes to be more similar in shape and function to living organs.

According to an exemplary embodiment of the present disclosure, there is provided a spontaneous-contracting cardiac organoid including a chamber in which a fluid is stored, a first pipe connected to the chamber so that the fluid flows therethrough, a second pipe connected to the chamber so that the fluid is discharged therethrough, and a valve formed on the first pipe to spontaneously open/close an inflow pipe.

At this time, according to a feature of the present disclosure, the chamber expresses TUBB3, TNNT2, PECAM1 and MYL2, and trabeculated cardiomyocytes may be formed toward an inner pipe of the chamber. Furthermore, the chamber may be formed with a calcium transient.

According to an exemplary embodiment of the present disclosure, there is provided a method for evaluating drug toxicity by using a cardiac organoid including reacting the aforementioned cardiac organoid with a drug, washing the cardiac organoid after the drug reaction, culturing the washed cardiac organoid, capturing images of the reacting, washing and culturing, obtaining the captured images, and analyzing the obtained images.

According to the feature of the present disclosure, in the analyzing of the images, conduction displacement, beat rate variation, and beating velocity may be measured based on a difference in amount of change of pixel values between a cell area and a background area in images continuously captured during contraction of the cardiac organoid. For example, the analyzing may include cellogy pulse analysis, but is not limited thereto.

Hereinafter, the present disclosure will be described in more detail with reference to Examples. However, these Examples are only illustrative for the present disclosure, and the scope of the present disclosure is not limited to these Examples.

Advantageous Effects

According to the present disclosure, by providing the cardiac organoid, the manufacturing method thereof, and the method for evaluating the drug toxicity using the same, there is an effect capable of evaluating validation, that is, efficacy, side effects, and toxicity of a drug in development of new drugs.

More specifically, unlike conventional organoids having a structure different from that of a living heart, the cardiac organoid of the present disclosure may have a ventricle, inlet and outlet, a valve-like structure chamber, inflow and outflow pipes, and a valve, perform spontaneous contraction without external electrical stimulation, and act as the valve such as valve movement and circulate the external and internal liquids. Accordingly, it is possible to confirm the structural abnormality of the heart according to the drug.

Furthermore, according to the present disclosure, it is possible to confirm the efficacy, side effects, and toxicity according to the drug even in the same detailed functions as blood vessels and nerves of the living heart by expressing TUBB3 as an identification marker for nerve cells, TNNT2 as an identification marker for cardiomyocytes, PECAM1 as an identification marker for vascular endothelial cells, and MYL2 as a ventricle identification marker.

Therefore, the cardiac organoid of the present disclosure can be used to evaluate side effects, toxicity and efficacy of drugs as a biomimetic model that is functionally and structurally similar to a living heart.

Further, the cardiac organoid of the present disclosure can be used for screening of drug candidate materials in new drug development, dramatically reduce required cost and time, and be used for physiological research and clinical trials of heart cancer. Furthermore, the present disclosure can be used for personalized diagnosis capable of reducing cost of treatment by preventing unnecessary drug administration by allowing experiments on various causes of the disclosure.

In addition, since the organoid has low tumorigenicity and excellent regenerative ability, the cardiac organoid of the present disclosure can be used as a regenerative therapeutic agent that can be transplanted into damaged heart to regenerate the heart.

The effects of the present disclosure are not limited by the foregoing, and other various effects are anticipated herein.

BEST MODE FOR THE INVENTION

Advantages and features of the present disclosure, and methods for accomplishing the same will be more clearly understood from exemplary embodiments to be described below in detail with reference to the accompanying drawings. However, the present disclosure is not limited to the exemplary embodiments set forth below, and will be embodied in various different forms. The exemplary embodiments are just for rendering the disclosure of the present disclosure complete and are set forth to provide a complete understanding of the scope of the disclosure to a person with ordinary skill in the art to which the present disclosure pertains, and the present disclosure will only be defined by the scope of the claims.

As used herein, the term "differentiation" means that cells are developed at a level of a complex of specific cells or tissues or individual having a specific function.

Example 1. Manufacturing Method of Cardiac Organoid and Process for Forming Cardiac Organoid Through the Same Hereinafter, a manufacturing method of a cardiac organoid according to an exemplary embodiment of the present disclosure and a process for forming a cardiac organoid through the method will be described in detail with reference to FIGS. 1 to 10C.

Figure 1:
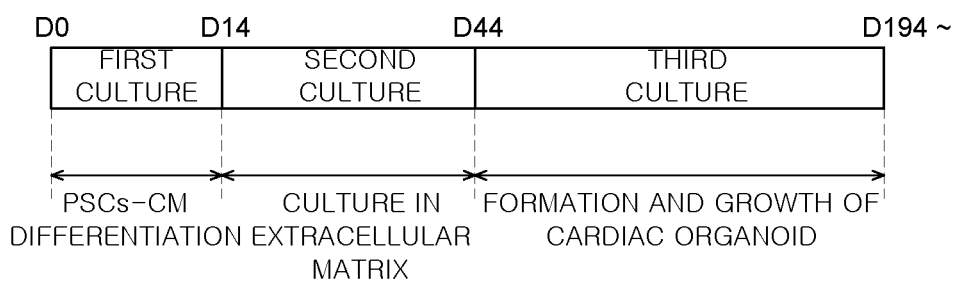
FIG. 1 illustrates a process of a manufacturing method of a cardiac organoid according to an exemplary embodiment of the present disclosure.

FIG. 1 illustrates a process of a manufacturing method of a cardiac organoid according to an exemplary embodiment of the present disclosure.

Referring to FIG. 1, a manufacturing method of a cardiac organoid according to an exemplary embodiment of the present disclosure includes a first culturing step of differentiating pluripotent stem cells (PSCs) into cardiomyocytes (CMs), a second culturing step of culturing the differentiated cardiomyocytes and an extracellular matrix (ECM) in a first maintenance medium so as to form a fusion tissue, and a third culturing step of culturing the formed fusion tissue in a third maintenance medium so as to form and grow a cardiac organoid.

In this case, the term "first maintenance medium" as used herein refers to a natural or artificial serum-free medium without containing insulin used to maintain and grow animal cells. More specifically, the first maintenance medium may intentionally exclude the insulin to suppress the formation of cardiomesoderm, a process before the formation of myocardia, and to suppress cell damage caused by active oxygen by including antioxidants, in the formation of pluripotent stem cell-derived cardiomyocytes. Furthermore, the first maintenance medium may include all of various serum-free media, such as an insulin-free minimal essential medium (MEM), an Eagle's minimal essential medium (Eagle's MEM), a Dulbecco's modified Eagle's medium (DMEM), Ham's F 12, SF 12 and RPMI 1640, and variants thereof, preferably insulin-free RPMI 1640, but is not limited thereto.

Furthermore, in culture environment conditions, the temperature may be 36° C. to 38° C., preferably 36.5° C. to 37.5° C., supply oxygen ($O_2$) may be 1% to 25%, and supply carbon dioxide ($CO_2$) may be 1% to 15%.

Hereinafter, each of the above-described first culturing step, the second culturing step, and the third culturing step will be described in detail.

(1) First Culturing Step for Forming Cardiomyocytes

Figure 2A:
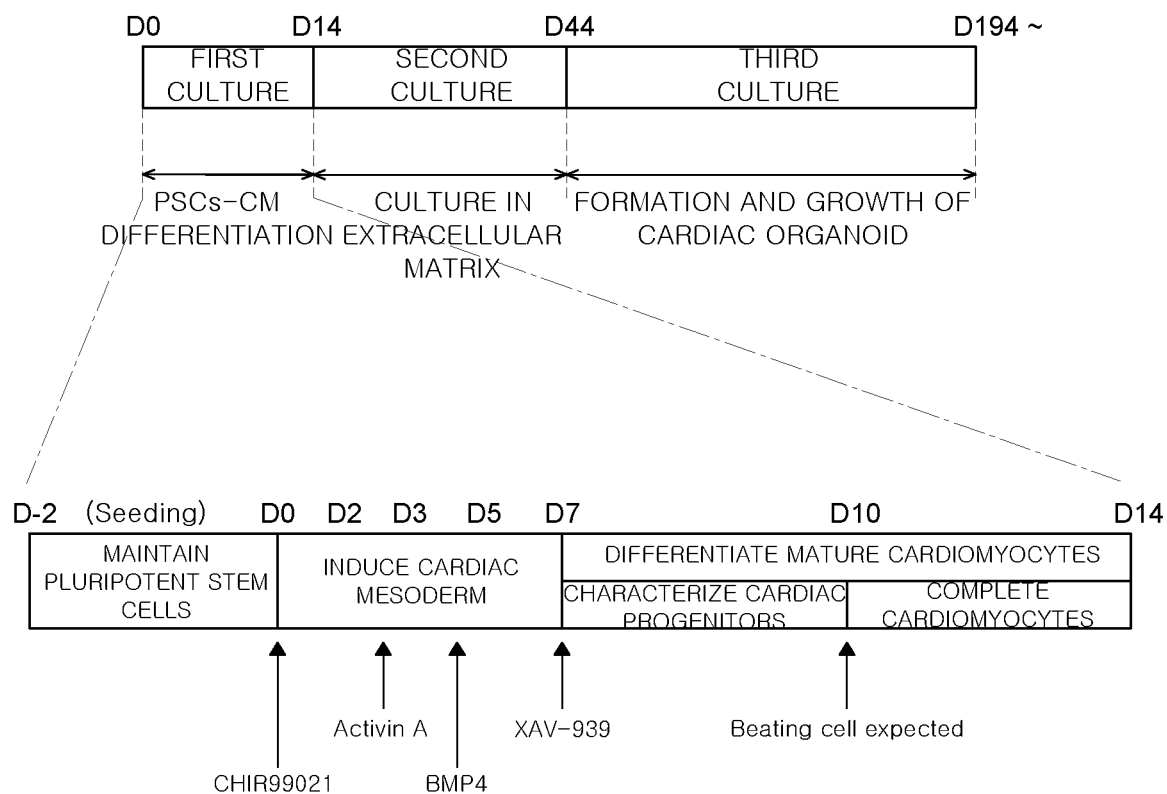
FIGS. 2A and 2B illustrate a process of a first culturing step in the manufacturing method of the cardiac organoid according to an exemplary embodiment of the present disclosure.
Figure 2B:
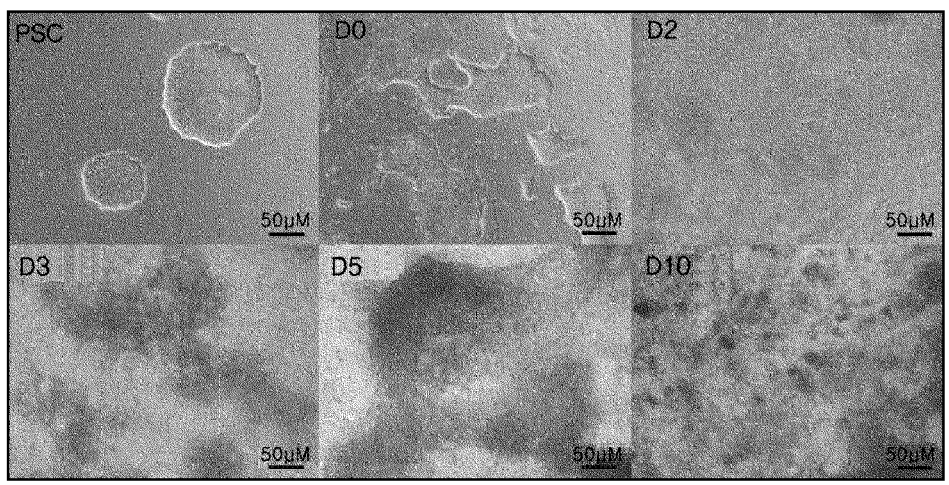

First, FIG. 2A illustrates a process of the first culturing step in the manufacturing method of the cardiac organoid according to an exemplary embodiment of the present disclosure. Hereinafter, for convenience of description, the process will be described with reference to FIG. 2B.

Referring to FIG. 2A, the first culturing step may include seeding pluripotent stem cells, maintaining the seeded pluripotent stem cells in the first maintenance medium, culturing the pluripotent stem cells in an induction medium so that the pluripotent stem cells are induced into cardiac progenitors through a mesoderm cell stage, and culturing mesoderm cells in the first maintenance medium to differentiate the cardiac progenitors into mature cardiomyocytes.

More specifically, in seeding the pluripotent stem cells, the pluripotent stem cells in an undifferentiated state are isolated from a tissue using a proteolytic enzyme, and then suspended in the first maintenance medium and seeded on a plate so that the density of the pluripotent stem cells is 3 to $6\times10^4/cm^2$. At this time, the density of the seeded pluripotent stem cells is 3 to $6\times10^4/cm^2$, but is not limited thereto, and may preferably be $5\times10^4/cm^2$.

Furthermore, the term "proteolytic enzyme" as used herein refers to an enzyme capable of isolating an intercellular matrix in order to liberate cells or cell aggregates included in a living tissue, and may be used with collagenase, dispase, protease, trypsin, etc. to isolate the pluripotent stem cells or to isolate the cells and cell aggregates from the tissue, but is not limited thereto.

Furthermore, the term "plate" as used herein is not limited as long as the cell culture may be performed, and may be used with various shaped plates such as flasks, tissue culture flasks, dishes, petri dishes, micro plates, micro well plates, micro slides, Pamber slides, chalets, tubes, trays, and culture bags, and may include a cell adhesion layer coating film on an upper surface thereof. More specifically, the coating film of the plate may include at least one of collagen, fibronectin, lamidine, lamidine fragment, vitronectin, basement membrane matrix, gelatin, hyaluronic acid, polylysine, and matrigel, but is not limited thereto. As the pluripotent stem cells are cultured on the plate including the coating film, adhesion and extension of cells is promoted, so that differentiation efficiency of mesodermal cells may be increased.

Next, the maintaining of the seeded pluripotent stem cells in the first maintenance medium, as a step for adapting and stabilizing the seeded pluripotent stem cells, is changing the first maintenance medium every day for 2 to 3 days and culturing the pluripotent stem cells. Accordingly, referring to FIG. 2B, the pluripotent stem cells are stabilized through the maintaining in the first maintenance medium, and spherical pluripotent stem cells are attached to the plate on a culture start day D0.

Next, in the culturing of the pluripotent stem cells in the induction medium so that the pluripotent stem cells are induced into the cardiac progenitors through the mesoderm cell stage, the pluripotent stem cells are cultured in an induction medium containing 0.1 to 8 µM of CHIRR99021, 50 to 150 ng/ml of Activin A, 1 to 10 ng/ml of BMP4, 0.01 to 3 µM of a Wnt inhibitor, and the first maintenance medium, to induce the mesoderm cells.

More specifically, the pluripotent stem cells attached onto the plate are cultured for 2 days in a medium containing 0.1 to 8 µM of CHIRR99021 and the first maintenance medium on the culture start day D0. At this time, the content of CHIRR99021 may be 0.5 to 8 µM, but preferably, the content of CHIRR99021 capable of improving the effect of survival and proliferation of the pluripotent stem cells may be 5 to 7 µM on the culture start day D0.

At this time, CHIRR99021 is a material that inhibits the activity of glycogen synthase kinase (GSK)-3β. More specifically, as GSK-3β is suppressed, β-catenin of a signaling system involved in cell proliferation is not decomposed by GSK-3β, and the expression level of genes involved in cell proliferation is increased, thereby improving the survival and proliferation of cells.

In addition, Activin A and BMP4 are growth and differentiation factors belonging to a TGF-β group, and may activate BMP and Activin/Nodal signals, which are important cell signaling systems during embryonic development, to inhibit differentiation into an ectodermal nervous system and promote the differentiation of a mesodermal system.

In addition, the Wnt inhibitor is a material that inhibits Wnt protein that contributes to an intracellular signaling system, and may differentiate mesoderm cells into cardiac progenitors by activating GSK-3β. Furthermore, the Wnt inhibitor may include at least one of the group consisting of IWR-1 endo, XAV-939, JW74, SEN461, ICG-001, LGK-974, IWP-2, IWP-4, Wnt-C59 and WIKI4, but is not limited thereto, and may include any material capable of activating GSK-3β by inhibiting a Wnt signaling system. Through such treatment with the Wnt inhibitor, the mesoderm cells may be differentiated into high-purity cardiac progenitors having a positive rate of 80 to 98% of cardiac troponin T (cTnT), one of constituent proteins of cardiomyocytes.

Thereafter, pluripotent stem cells D2 on the second day of culture are cultured for 1 day by removing CHIRR99021 and changing the medium with a medium including the first maintenance medium mixed to have 50 to 150 ng/ml of Activin A and matrigel in a volume ratio of 1:40.

Then, pluripotent stem cells D3 on the third day of culture may be cultured for 2 days and induced to mesoderm cells by replacing the medium with a medium containing 0.5 to 8 µM of CHIRR99021, 1 to 10 ng/ml of BMP4, and the first maintenance medium. At this time, the content of CHIRR99021 may be 0.5 to 8 µM, but preferably, the content of CHIRR99021 capable of improving the effect of survival and proliferation of the pluripotent stem cells on the third day D3 may be 0.5 to 2 µM.

Thereafter, pluripotent stem cells D5 on the fifth day of culture induced to the mesoderm cells are cultured for 2 days by changing the medium with a medium containing 0.01 to 3 µM of the Wnt inhibitor and the first maintenance medium.

Accordingly, by the above-described method, pluripotent stem cells D7 cultured for 7 days may be induced and differentiated into cardiac progenitors through the mesodermal cell stage. More specifically, referring to FIG. 2B, the pluripotent stem cells may be cultured in a form attached to a plate D0 and induced and differentiated into cardiac progenitors D5 through the mesodermal cell stages D2 and D3.

Thereafter, the differentiated cardiac progenitors are cultured in the first maintenance medium to differentiate into mature cardiomyocytes. More specifically, referring to FIG. 2B, in the cardiac progenitors, spontaneous-contracting mature cardiomyocytes start to appear from the fifth day D10 of culture and the cardiomyocytes may be proliferated and grown through culturing for 4 to 5 days in the first maintenance medium after the appearance of the mature cardiomyocytes. In this case, when a period of culture for proliferation and growth of cardiomyocytes passes 4 to 5 days, the number of cardiomyocytes may be reduced. Accordingly, the culture period for maximizing the yield of cardiomyocytes may be preferably 4 to 5 days (14 to 15 days after culturing from pluripotent stem cells).

Through the first culturing step, the pluripotent stem cells have an effect of differentiating the mature cardiomyocytes capable of spontaneous-contracting with high yield. Furthermore, these mature cardiomyocytes may be utilized as a fundamental therapeutic agent for cardiomyocytes. For example, these mature cardiomyocytes may be used in regenerative cell therapy to restore heart functions or to treat heart diseases. In addition, the cardiomyocytes formed through the first culturing step may be used even in experiments for determining the stability and effect of a candidate material on cardiac toxicity in the process of developing a new drug.

(2) Second Culturing Step for Forming Fusion Tissue

Figure 3A:
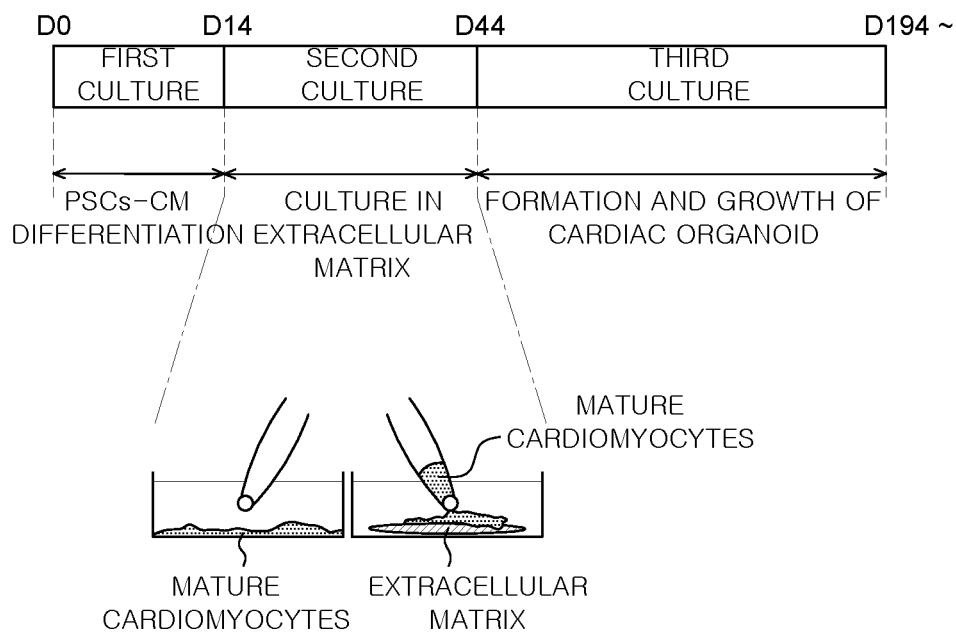
FIGS. 3A and 3B illustrate a process of a second culturing step in the manufacturing method of the cardiac organoid according to an exemplary embodiment of the present disclosure.

First, FIG. 3A illustrates a process of the second culturing step in the manufacturing method of the cardiac organoid according to an exemplary embodiment of the present disclosure. Hereinafter, for convenience of description, the process will be described with reference to FIGS. 3B to 4B.

Referring to FIG. 3A, the second culturing step is performed after the first culturing step so that the pluripotent stem cells are differentiated into the mature cardiomyocytes, and the mature cardiomyocytes formed through the first culturing step are collected, placed on an extracellular matrix, added with the first maintenance medium, and cultured for at least one period of 28 to 32 days so that the cardiomyocytes and the extracellular matrix form a fusion tissue.

Figure 3B:
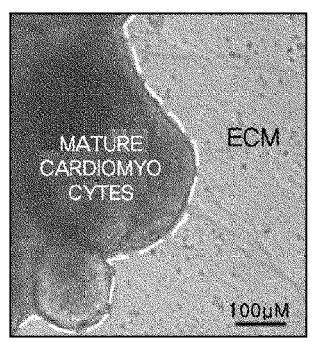
Figure 3B:
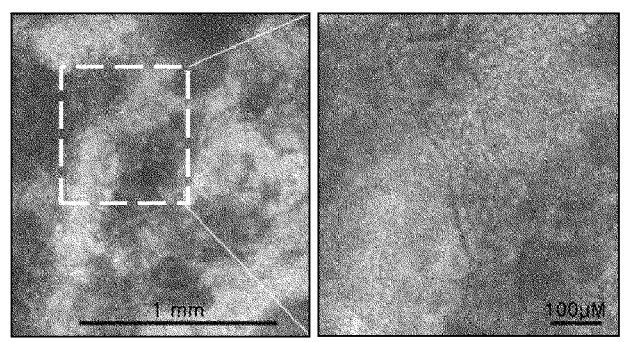

More specifically, referring to FIG. 3B, on the first day of the second culture D0, the cardiomyocytes and the extracellular matrix appear to be separated from each other. However, as the cell culture progresses, the cardiomyocytes and the extracellular matrix are tightly fused to each other to form a cell clump, and when cultured for 30 days, the cell clump spread widely on the extracellular matrix to form a fusion tissue in the form of a patch.

At this time, the term "extracellular matrix (ECM)" as used herein refers to a support in the development of a tissue having a three-dimensional structure which plays an important role in providing signals affecting various cellular metabolic pathways such as proliferation, differentiation and death of the cells. The extracellular matrix may store and supply biochemical factors necessary for the growth and differentiation of the cells, and provide a physical environment which may be recognized by the cells at the same time. The extracellular matrix is a product produced by cells constituting each tissue as needed, and includes structural proteins such as collagen and elastin, polysaccharides such as glycosaminoglycan (GAG), adhesive proteins that helps the adhesion of cells, and growth factors. Such an extracellular matrix consists of different components depending on a tissue and a cell to be derived, and has special physical properties.

Accordingly, the extracellular matrix used in an exemplary embodiment of the present disclosure may be obtained from fibroblasts, preferably from fibroblasts derived from a cardiac tissue.

Figure 4A:
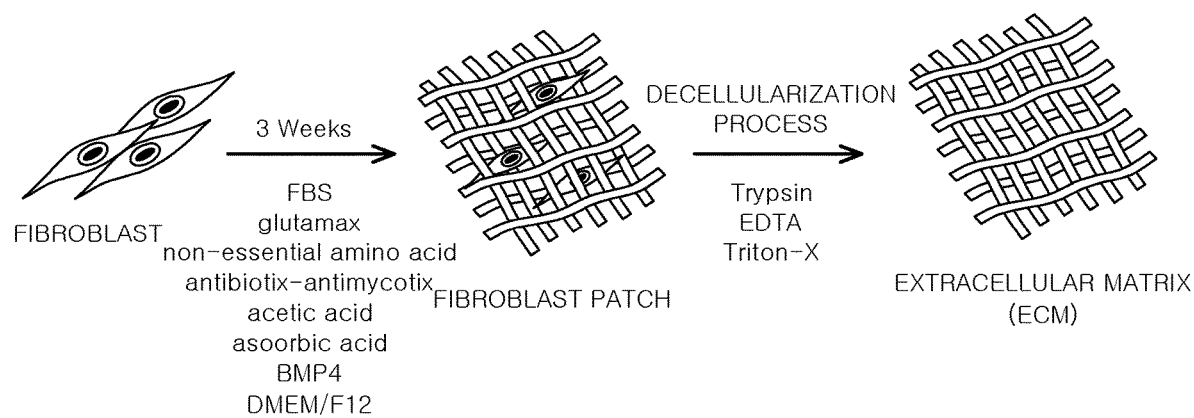
FIGS. 4A and 4B illustrate a process of a method of producing an extracellular matrix used in the manufacturing method of the cardiac organoid according to an exemplary embodiment of the present disclosure.
Figure 4B:
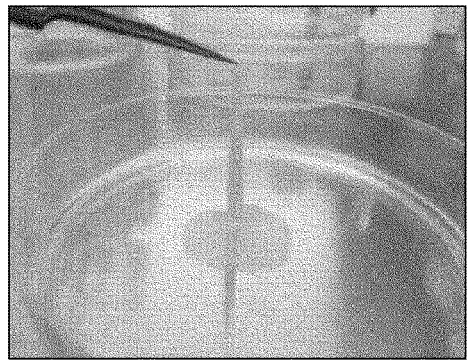
Figure 4B:
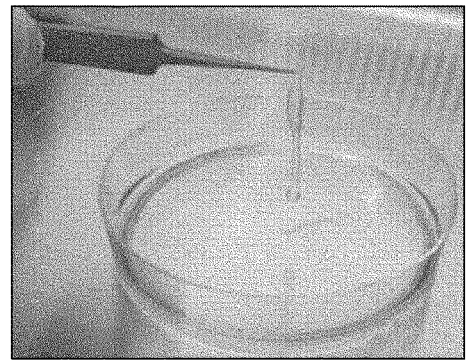

More specifically, referring to FIG. 4A, first, the fibroblasts obtained from the cardiac tissue are cultured for 3 weeks in a low-serum medium (Advanced DMEM/F12) containing 8 to 10% FBS, 0.5 to 2% glutamax, 0.5 to 2% non-essential amino acids, 0.5 to 2% antibiotix-antimycotix, 1 to 3 mM acetic acid, 0.1 to 0.3 mM ascorbic acid and 5 to 15 ng/ml of BMP4 to release the extracellular matrix from the fibroblasts. Thereafter, the extracellular matrix is released, and only the extracellular matrix is extracted through a decellularization process of the tissue bound to the fibroblasts in the form of the patch. At this time, in the decellularization process, the tissue bound in the form of the patch is treated with 0.25% trypsin in a constant temperature bath of 37° C. for 3 hours, added with PBS containing 3% triton-X and 0.05% EDTA, and then stirred for 30 minutes. Accordingly, referring to FIG. 4B, a connective tissue, which has been opaque due to a mixture of the fibroblasts and the extracellular matrix, is subjected to decellularization, and as a result, the fibroblasts are isolated and only the extracellular matrix remains to reduce the volume and be changed transparent.

Through the second culturing step, as the cardiomyocytes are cultured with the extracellular matrix derived from fibroblasts of the heart tissue, there is an effect of developing the cardiomyocytes into a cardiac fusion tissue in a physical environment similar to a living body.

(3) Third Culturing Step for Forming Cardiac Organoid

Figure 5A:
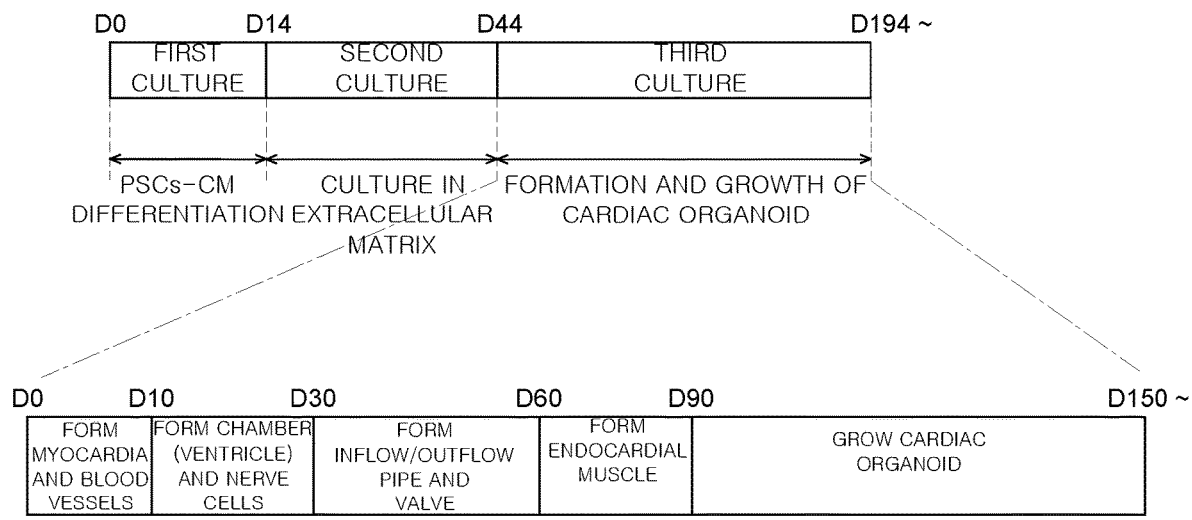
FIGS. 5A and 5B illustrate a process of a third culturing step in the manufacturing method of the cardiac organoid according to an exemplary embodiment of the present disclosure.
Figure 5B:
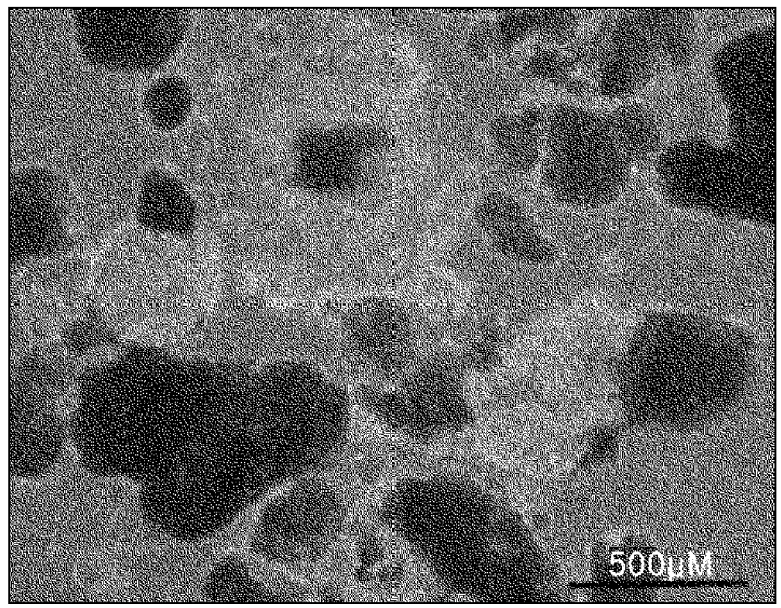
Figure 5B:
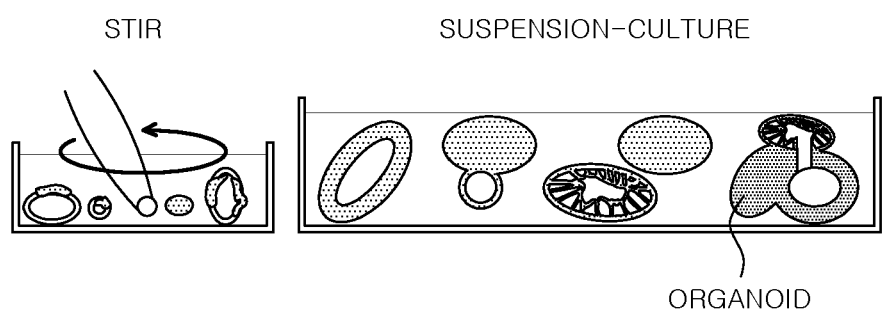

First, FIG. 5A illustrates a process of the third culturing step in the manufacturing method of the cardiac organoid according to an exemplary embodiment of the present disclosure. Hereinafter, for convenience of description, the process will be described with reference to FIGS. 5B to 10C.

Referring to FIG. 5A, the third culturing step is performed after the second culturing step for forming the fusion tissue, and the fusion tissue formed from the second culturing step is cultured in the second maintenance medium. More specifically, referring to FIG. 5B, a microscopic image in which the fusion tissue in the form of the patch is cut is illustrated. Before the culture, the fusion tissue in the form of the patch is physically cut into several pieces using a pipette, etc. Then, after 3 to 10 cut tissues are transferred to the plate, the second maintenance medium is changed once every 2 days, and the cut tissues are floating-cultured or suspension-cultured.

At this time, the term "suspension-culturing" as used herein refers to a three-dimensional cell culture model in which cells are continuously moved using a stirrer such as a spinner and a rotational chamber so as not to be attached to the bottom and then suspended and grown in a solution. The suspension-culturing has characteristics of creating a structure reflecting an original tissue structure by attaching cells with higher affinity to each other through cell-to-cell interactions when the cells are suspended in a culture medium.

In addition, the term "second maintenance medium" as used herein refers to a natural or artificial serum-free medium that contains insulin used to maintain and grow animal cells. More specifically, the second maintenance medium may promote the absorption of glucose and amino acids including insulin, and promote cardiac organoid formation and growth. Furthermore, the second maintenance medium may include all of various serum-free media, such as an insulin-containing minimal essential medium (MEM), an Eagle's minimal essential medium (Eagle's MEM), a Dulbecco's modified Eagle's medium (DMEM), Ham's F 12, SF 12 and RPMI 1640, and variants thereof, preferably insulin-containing RPMI 1640, but is not limited thereto.

The cardiac organoid formed by the above-described method may be formed through a process similar to an embryological process of a living heart, thereby forming a living body response model that is very similar in shape and function to the living heart.

For example, referring again to FIG. 5A, the fusion tissue formed from the cardiomyocytes and the extracellular matrix may form myocardia and blood vessels, chambers (ventricles) and nerves, inflow and outflow pipes and valves, and endocardial muscle during the third culturing step to develop into a cardiac organoid and may be continuously grown and maintained. In this case, the formation period of each tissue is shown as 0 to 10 days for myocardia and blood vessels, 10 to 30 days for chambers and nerves, 30 to 60 days for inflow and outflow pipes and valves, and 60 to 90 days for endocardial muscle from a start date of the third culturing step, respectively. However, the formation period of each cell and tissue is not limited thereto, and may vary depending on the development and growth rates of cells according to the size of the cut tissue.

Meanwhile, as the heart contracts due to the regulation of calcium ion concentration in cardiomyocytes, the presence of cardiomyocytes and spontaneous contraction may be confirmed by checking calcium transients.

Figure 6A:
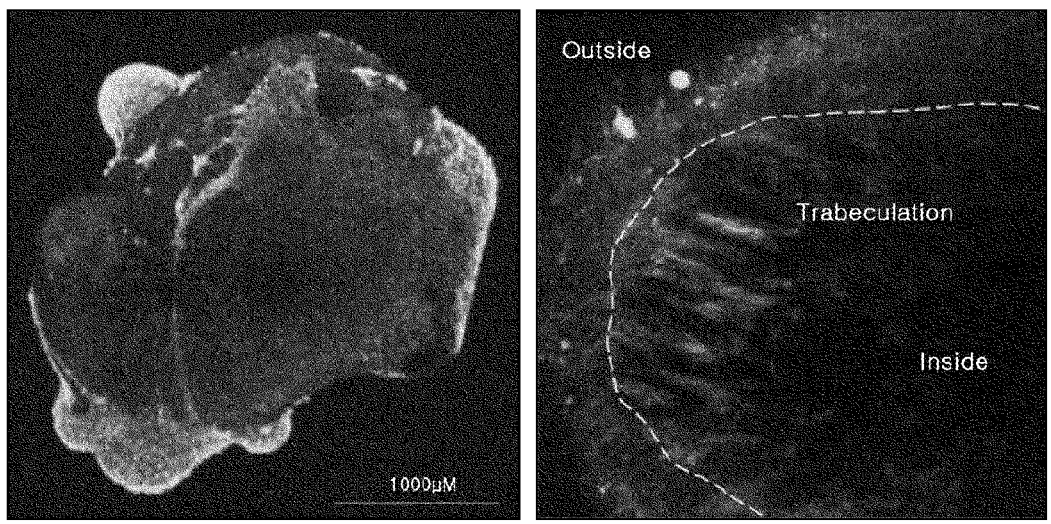
FIGS. 6A and 6B illustrate image results of myocardia of a cardiac organoid according to an exemplary embodiment of the present disclosure.
Figure 6B:
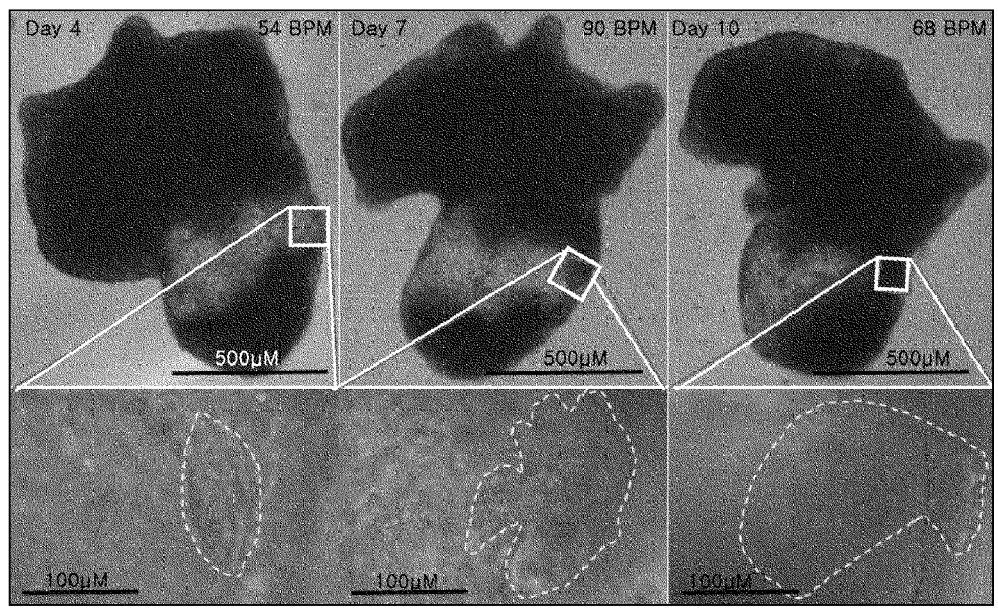
Figure 7:
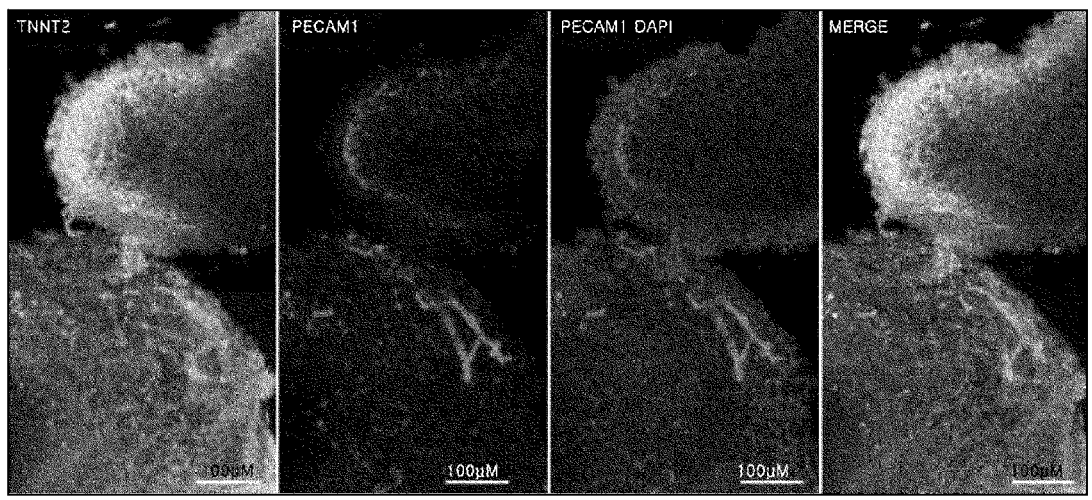
FIG. 7 illustrates image results of vascular endothelial cells of the cardiac organoid according to an exemplary embodiment of the present disclosure.

Accordingly, in order to confirm whether the myocardia are formed, referring to FIG. 6A, a fluorescent staining image of the myocardial development using Fluo-4, a staining reagent that binds to intracellular calcium, is illustrated. It is shown that the calcium transient is formed in the outside and the inside of the cardiac organoid, which may mean that cardiomyocytes with calcium are present in the cardiac organoid and thus, spontaneous contraction may be performed without external electrical stimulation.

Furthermore, the cardiomyocytes in the lumen are formed by trabeculation in an inward direction of the cardiac organoid. This is similar to a process in which during the development of the heart, the cardiomyocytes extend in the ventricular lumen to form trabeculated cardiomyocytes and enlarge and fiberize the myocardia. More specifically, referring to FIG. 6B, as the culture progresses, the myocardia of the cardiac organoid become enlarged due to the trabeculated cardiomyocytes. At this time, it is illustrated that the cardiomyocytes are formed for 0 to 10 days from a start date of the third culturing step, but is not limited thereto.

Furthermore, blood vessels are formed in the cardiac organoid simultaneously with the formation of the myocardia. More specifically, referring to FIG. 7, an immunofluorescence staining image for angiogenesis using TNNT2 (troponin T2) as a marker for identifying cardiomyocytes, and platelet endothelial cell adhesion molecule 1 (PECAM1), as a marker for identifying vascular endothelial cells. At this time, a nucleus and a chromatin were contrasted and identified using DAPI staining. The vascular endothelial cells are formed in the outside and the lumen of the cardiac organoid along with the cardiomyocytes.

Accordingly, by the manufacturing method of the cardiac organoid according to an exemplary embodiment of the present disclosure and the cardiac organoid using the same, the myocardia of the cardiac organoid may be formed through the process similar to the formation of the myocardia shown in the heart development process and contracted according to a calcium ion concentration as calcium is formed in the cardiomyocytes of the cardiac organoid.

Figure 8A:
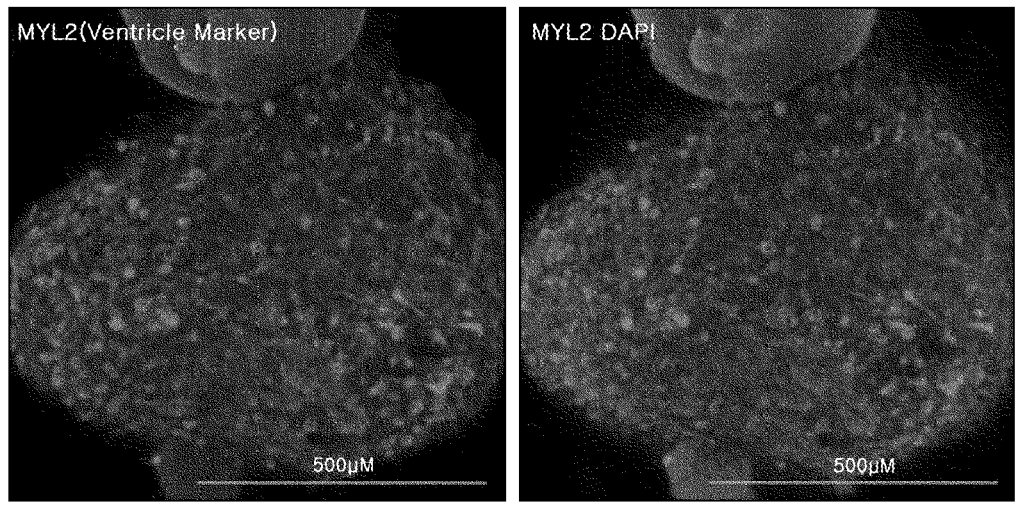
FIGS. 8A and 8B illustrate image results of a chamber of the cardiac organoid according to an exemplary embodiment of the present disclosure, which is an organ similar to the ventricle of the living heart.
Figure 8B:
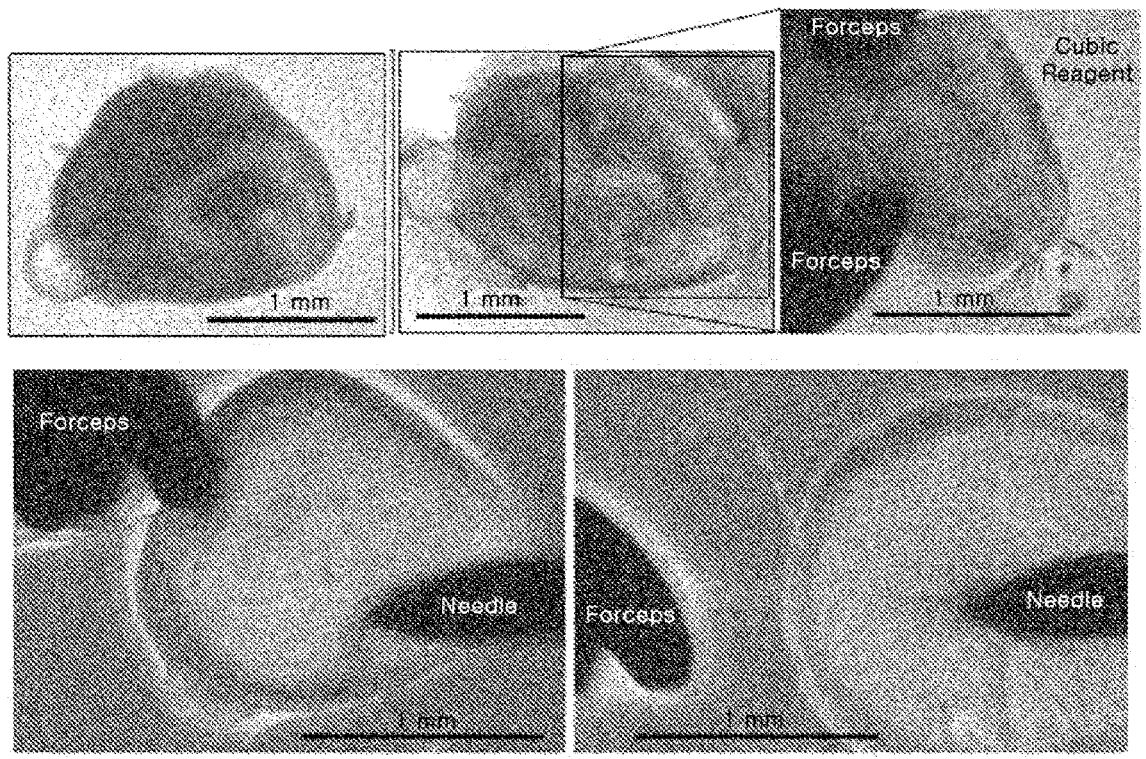

Next, in order to confirm whether a chamber, which is an organ like the ventricle of the living heart, is formed in the cardiac organoid, referring to FIG. 8A, immunofluorescence staining images for ventricular formation using myosin regulatory light chain 2 (MYL2) as a ventricular identification marker, are illustrated. MYL2, a ventricular identification marker, is expressed around the entire cardiac organoid, and as DAPI is also expressed at the same time as the expression of MYL2, apoptosis of the formed cardiac organoid does not occur. At this time, it is illustrated that the chamber is formed for 10 to 30 days from a start date of the third culturing step, but is not limited thereto.

On the other hand, the ventricle of the living body may refer to a tissue in which a chamber capable of accommodating a liquid is formed, rather than a simple muscle tissue. Accordingly, referring to FIG. 8B, a microscopic image of the cardiac organoid with the chamber is shown. At this time, in order to identify the chamber of the cardiac organoid, a needle and forceps were used. As a result of squeezing the cardiac organoid on the 30th day from the start date of the third culturing step using the forceps, the liquid which has contained in the chamber of the cardiac organoid is ejected.

Accordingly, the manufacturing method of the cardiac organoid according to an exemplary embodiment of the present disclosure and the cardiac organoid through the same may form a chamber morphologically similar to the ventricle of the living body.

Figure 9A:
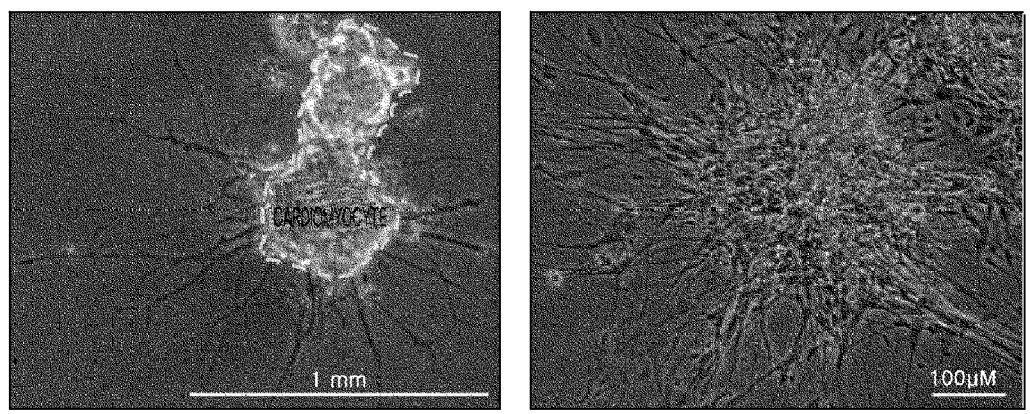
FIGS. 9A and 9B illustrate image results of nerve cells of the cardiac organoid according to an exemplary embodiment of the present disclosure.

Next, in order to confirm whether or not nerve cells are formed, referring to FIG. 9A, a microscopic image of spontaneous-contracting cardiomyocytes is shown. More specifically, it is illustrated that a bundle of neuron fibers is formed around the cardiomyocytes. Accordingly, it may mean that the nerve cells are formed from the cardiomyocytes before the organoid is formed.

Figure 9B:
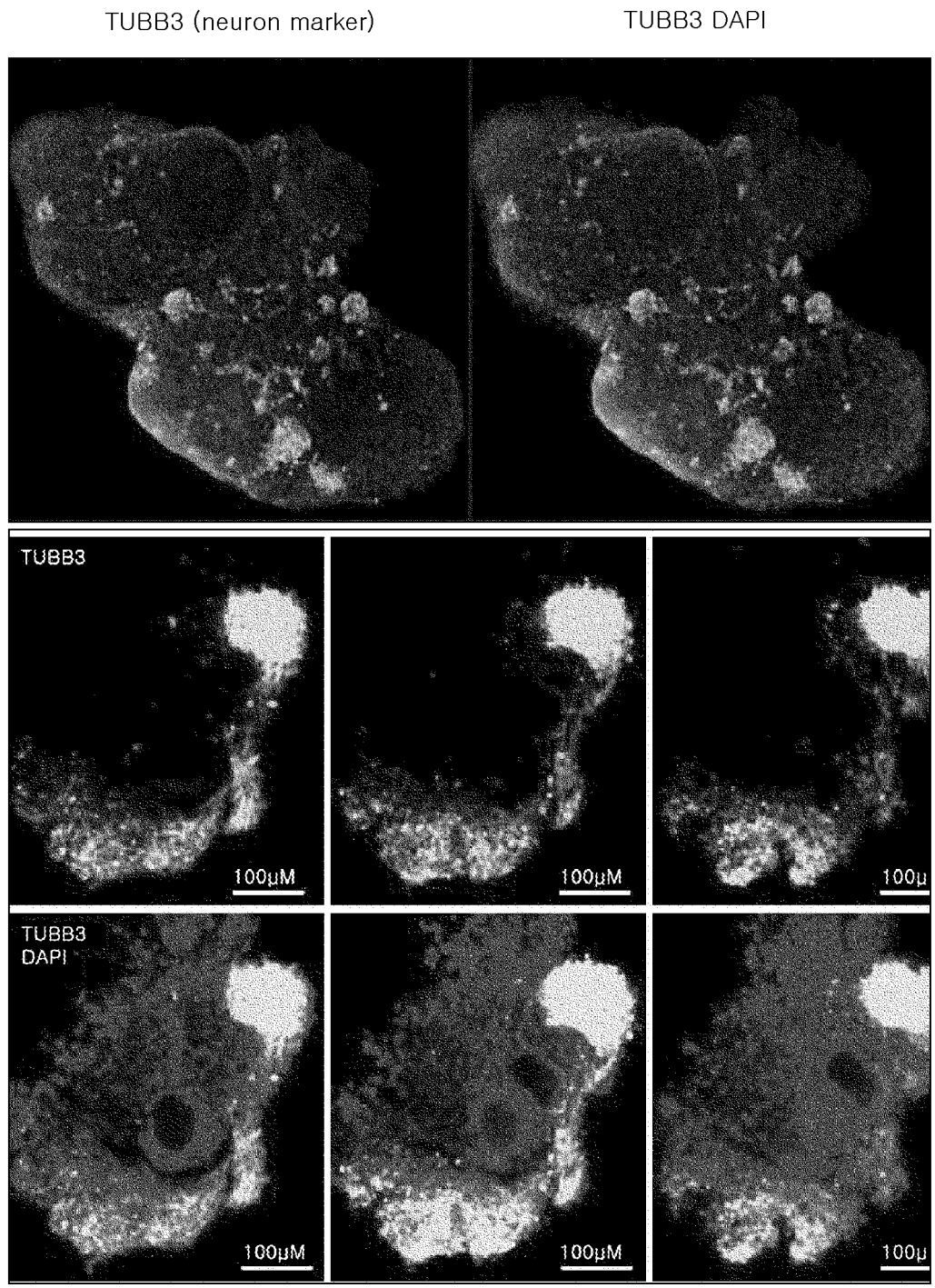

Furthermore, referring to FIG. 9B, an immunofluorescence staining image for neuronal cell formation using TUBB3 (β-tubulin-III), a neuronal cell identification marker, is shown. It is illustrated that the TUBB3, the neuronal cell identification marker, is expressed by surrounding the entire organoid. Accordingly, the manufacturing method of the cardiac organoid according to an exemplary embodiment of the present disclosure and the cardiac organoid through the same may exchange signals by an electrical method as the nerve cells are formed.

Figure 10A:
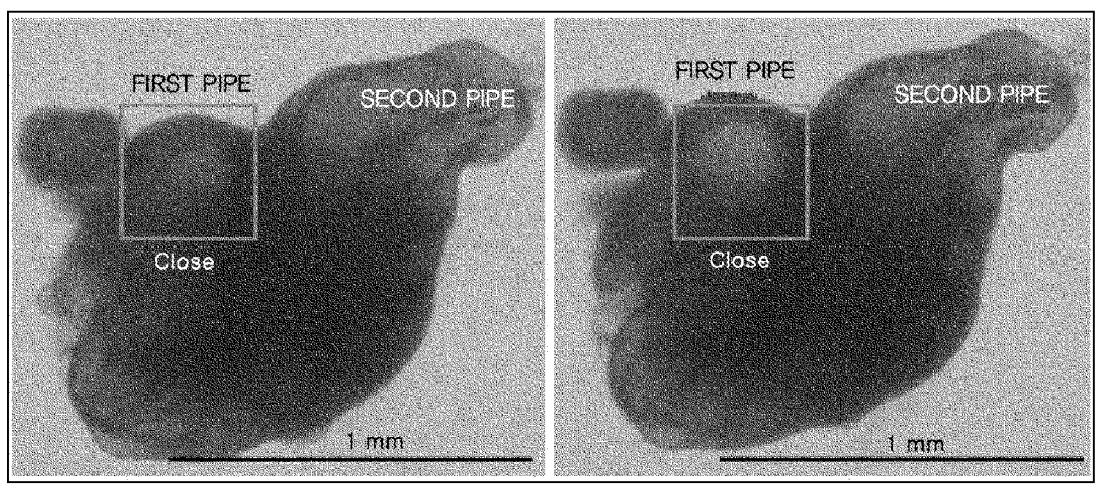
FIGS. 10A to 10C illustrate image results of inflow and outflow pipes and valves of the cardiac organoid according to an exemplary embodiment of the present disclosure.
Figure 10B:
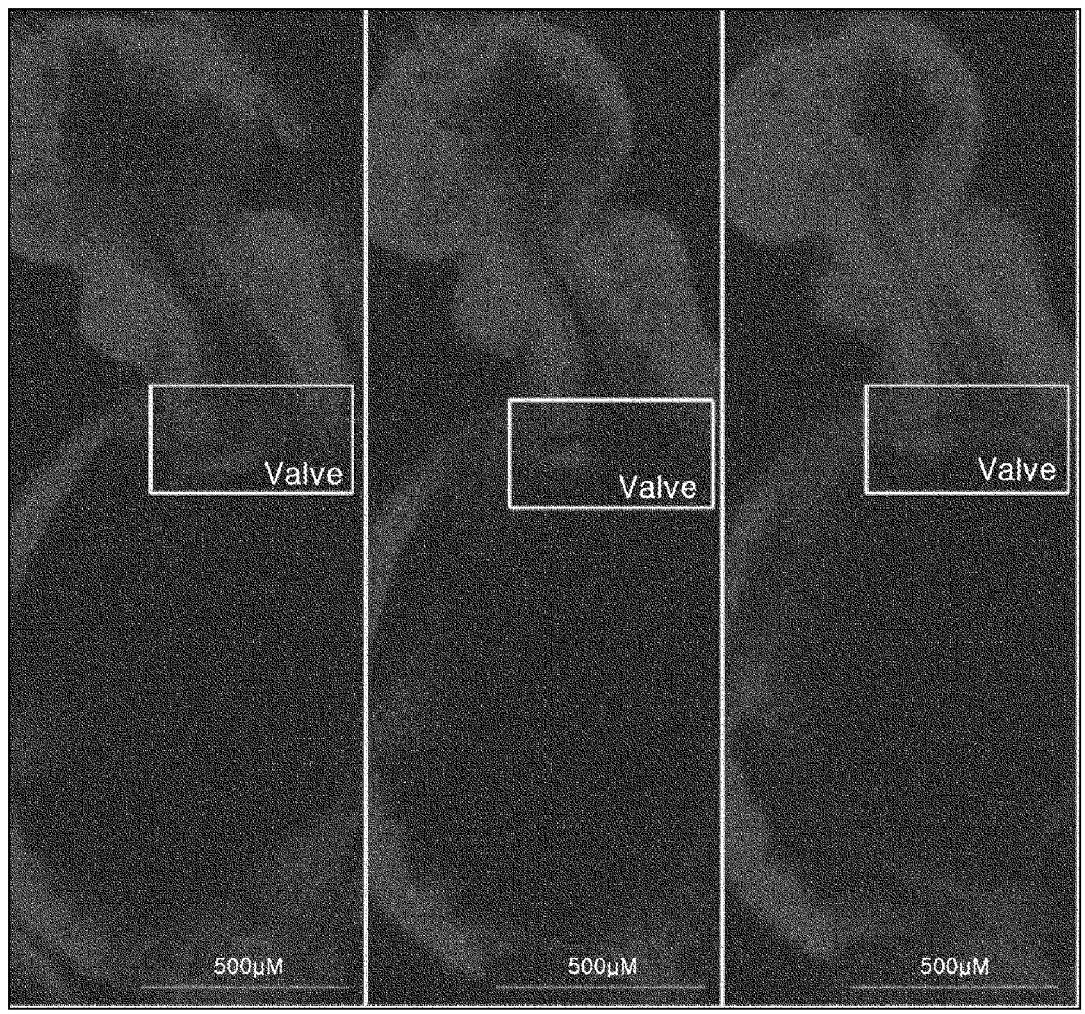

Next, in order to check whether the inflow and outflow pipes are formed, referring to FIG. 10A, a microscopic image of the inflow and outflow pipes of the cardiac organoid is shown. More specifically, it is illustrated that the cardiac organoid is formed with a first pipe connected to the chamber so that the fluid flows into the chamber and a second pipe connected to the chamber so that the fluid in the chamber is discharged therethrough. That is, the cardiac organoid may form a structure similar to the living heart which is connected to the veins and arteries so that the blood is circulated.

Furthermore, it is illustrated that a valve capable of controlling the inflow of the fluid by opening and closing the inflow pipe is formed in the first pipe through which the fluid flows into. More specifically, referring to FIG. 10B, a fluorescently stained image of the valve formed in the first pipe of the cardiac organoid is shown. The valve formed in the first pipe of the cardiac organoid is illustrated to open and close the first pipe by a thin muscle layer derived from the myocardia.

Figure 10C:
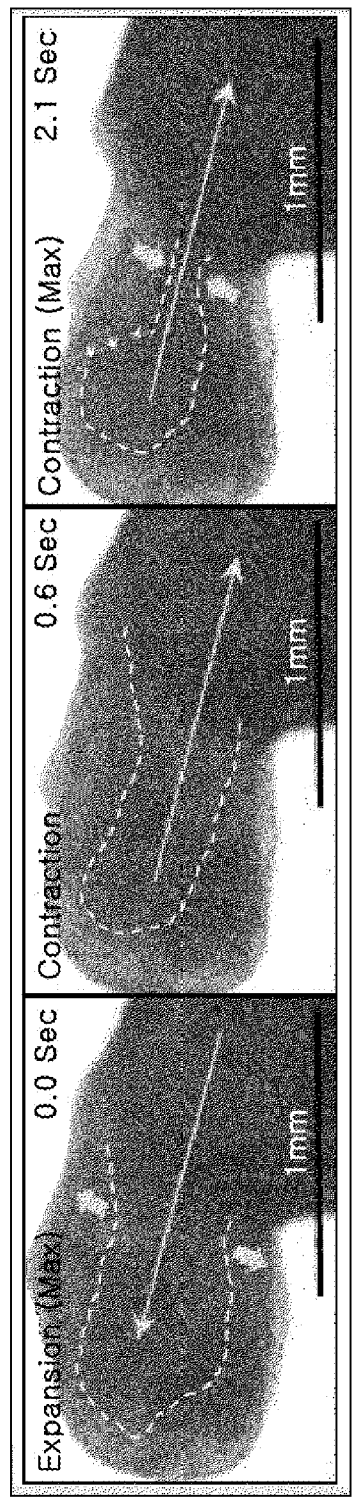

Further, referring to FIG. 10C, it is illustrated that the valves of the cardiac organoid are regulated according to a fluid flow. That is, the cardiac organoid may form valve-like function and structure to help the blood flow uniformly.

Accordingly, the manufacturing method of the cardiac organoid according to an exemplary embodiment of the present disclosure and the cardiac organoid using the same may constantly circulate the fluid in one direction inside and outside the cardiac organoid through the first pipe, the second pipe and the valve.

Through Example 1 above, the manufacturing method of the cardiac organoid according to various exemplary embodiments of the present disclosure and the cardiac organoid using the same are formed to be structurally and functionally similar to a living heart to be able to be used as a higher responsive biomimetic model.

Example 2. Confirmation of Functional Validation Evaluation of Cardiac Organoid

Hereinafter, contraction of the cardiac organoid according to an exemplary embodiment of the present disclosure will be described in detail with reference to FIGS. 11A and 11B.

Figure 11A:
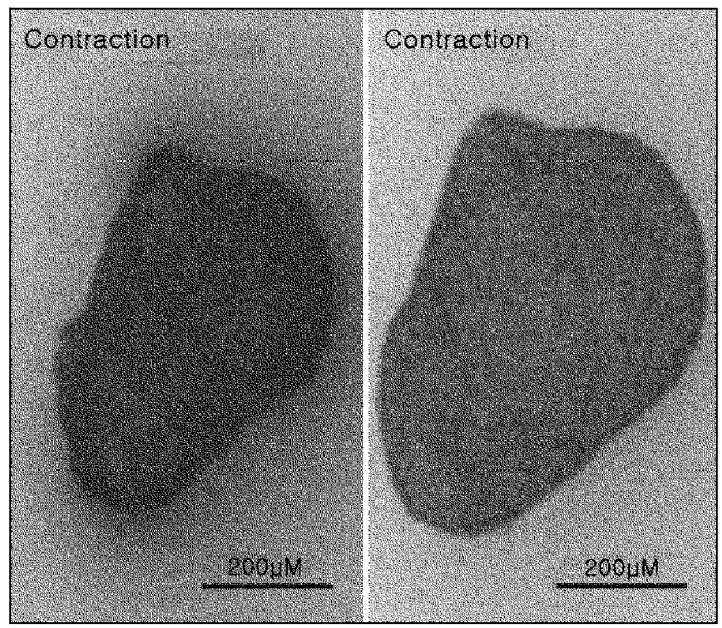
FIGS. 11A and 11B illustrate results of spontaneous contraction of the cardiac organoid according to an exemplary embodiment of the present disclosure.
Figure 11A:
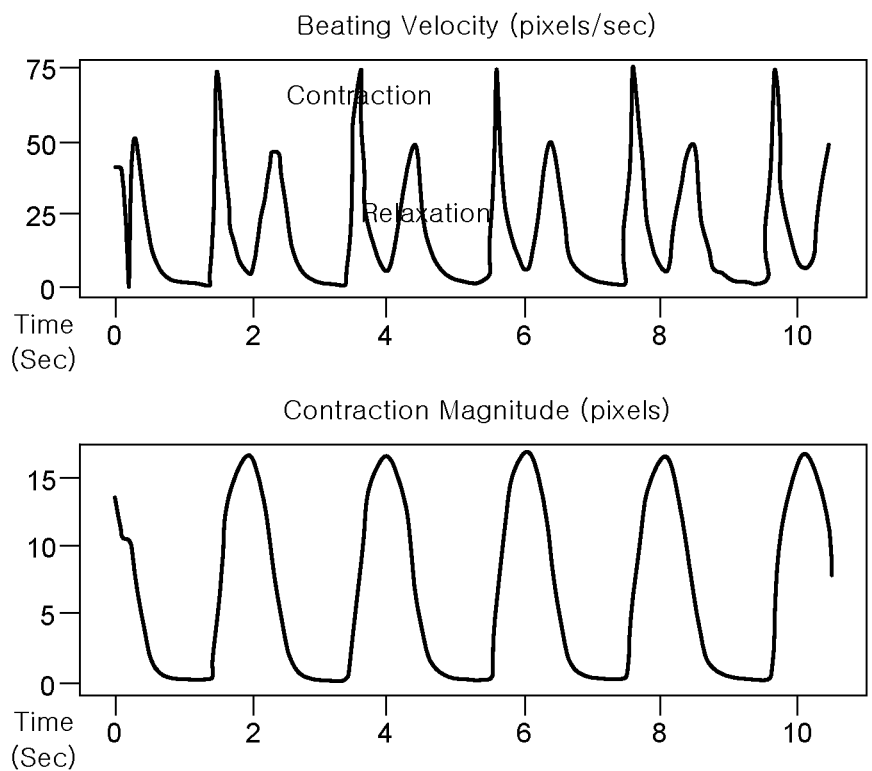
Figure 11B:
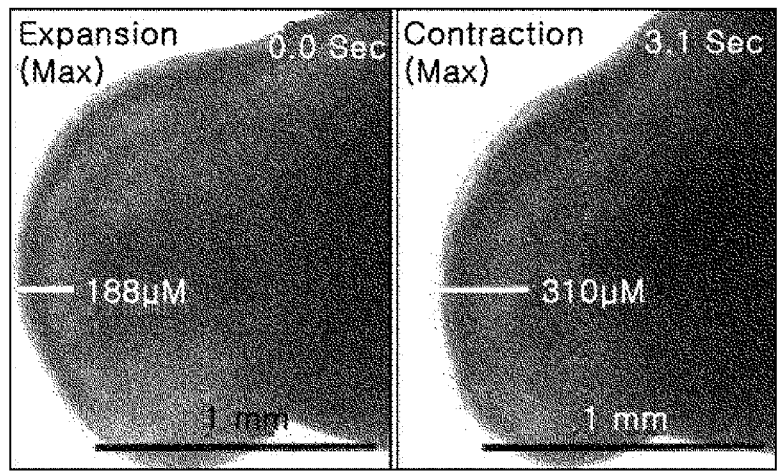
Figure 11B:
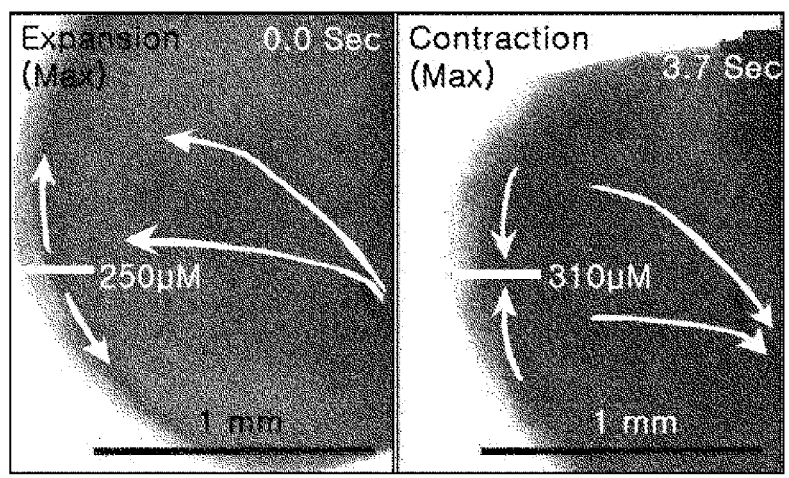

FIGS. 11A and 11B illustrate results of spontaneous contraction of the cardiac organoid according to an exemplary embodiment of the present disclosure.

Referring to FIG. 11A (a), a video image of contraction of the cardiac organoid is shown. In the cardiac organoid, it appears that a total area other than a part decreases upon contraction and expands upon relaxation. More specifically, referring to 11A (b), a result of expressing the video image information of FIG. 11A (a) in pixels/sec is shown. The spontaneous contraction of the cardiac organoid occurs approximately once per second. This may mean that the cardiac organoid has a beating rate similar to the normal human heart rate of 60 to 100 beats per minute. In this case, the contraction of the cardiac organoid occurs about once per second, but is not limited thereto, and may vary depending on the size and culture period of the cardiac organoid.

Furthermore, referring to FIG. 11B, an image of the myocardia during contraction of the cardiac organoid is shown. When the cardiac organoid relaxes so that a fluid flows in, the thickness of the myocardia is 188 to 250 μm, and when the cardiac organoid contracts so that the fluid flows out, the thickness of the myocardia is 310 μm. In this case, the thickness of the myocardia of the cardiac organoid is 188 to 250 μm during relaxation and 310 μm during contraction, but is not limited thereto, and may vary depending on the size and culture period of the cardiac organoid.

Through Example 2 above, as the cardiac organoid according to an exemplary embodiment of the present disclosure has spontaneous contraction, that is, beating rate similar to that of the living heart, in evaluation of toxicity and efficacy of a new drug, the cardiac organoid may be used as a functional simulation model for a living heart. Furthermore, the cardiac organoid according to an exemplary embodiment of the present disclosure may monitor changes in the myocardia and the inflow of the fluid according to the contraction occurring inside the organoid.

Example 3. Evaluation of Drug Toxicity Using Cardiac Organoid

Hereinafter, evaluation of drug toxicity using a cardiac organoid according to an exemplary embodiment of the present disclosure will be described in detail with reference to FIGS. 12 to 13D.

Figure 12:
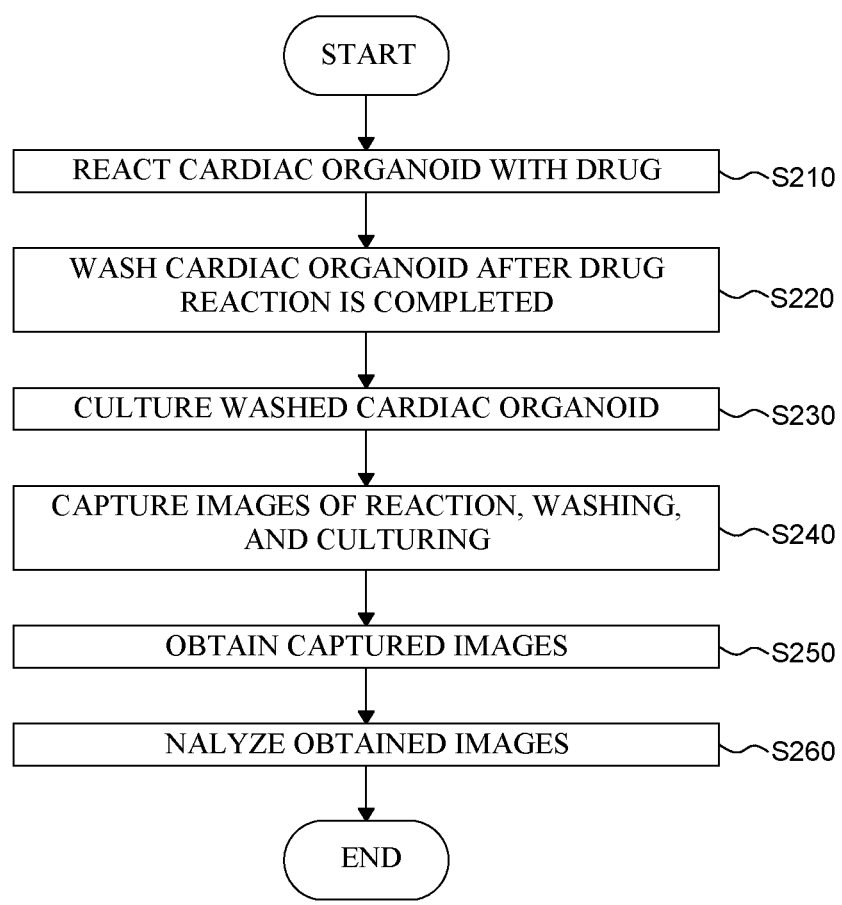
FIG. 12 illustrates a process of a method for evaluating drug toxicity by using a cardiac organoid according to an exemplary embodiment of the present disclosure.

FIG. 12 illustrates a process of a method for evaluating drug toxicity by using a cardiac organoid according to an exemplary embodiment of the present disclosure. The method for evaluating drug toxicity by using the cardiac organoid may include reacting the cardiac organoid with a drug (S110), washing the cardiac organoid after the drug reaction is completed (S120), culturing the washed cardiac organoid (S130), capturing images of the reaction, washing and culturing (S140), obtaining the captured images (S150), and analyzing the obtained images (S160).

In this case, the cardiac organoid may mean a cardiac organoid manufactured by the manufacturing method of the cardiac organoid according to an exemplary embodiment of the present disclosure. As trabeculated cardiomyocytes are formed toward the inner pipe of the chamber, the myocardia may be formed through a process similar to the formation of the myocardia that occur during the development of the heart.

Further, the cardiac organoid according to an exemplary embodiment of the present disclosure may include a chamber in which a fluid is stored, a first pipe connected to the chamber so that the fluid flows therethrough, a second pipe connected to the chamber so that the fluid is discharged therethrough, and a valve formed on the first pipe to spontaneously open/close an inflow pipe.

Furthermore, the cardiac organoid according to an exemplary embodiment of the present disclosure may express TUBB3 as an identification marker of nerve cells, TNNT2 as an identification marker of cardiomyocytes, PECAM1 as an identification marker of vascular endothelial cells, and MYL2 as a ventricle identification marker, and may form a calcium transient.

Accordingly, the cardiac organoid according to an exemplary embodiment of the present disclosure has a structure similar to an in-vivo heart, and may perform spontaneous contraction without external electrical stimulation and circulate external and internal fluids. Therefore, the cardiac organoid may be used as a biomimetic model in the evaluation of side effects, toxicity and efficacy of drugs.

For example, anticancer drugs required for anticancer treatment often induce cardiotoxicity and affect the patient's prognosis, and due to the cardiotoxicity of the anticancer drugs, ventricular dysfunction (LV dysfunction), ischemia, hypertension, arrhythmia, and the like may occur as cardiac side effects. More specifically, anthracyclines drugs such as doxorubicin, daunorubicin, idarubicin, and epiribucin cause damage to cardiomyocytes. Accordingly, through the cardiac organoid of the present disclosure, in which cardiomyocytes are identified by expression of TNNT2 as the identification marker for of cardiomyocytes, drugs causing damage to cardiomyocytes such as anthracyclines may be evaluated. Furthermore, through the cardiac organoid of the present disclosure in which the vascular endothelial cells have been identified by the expression of PECAM1, as the identification marker of vascular endothelial cells, drugs causing the damage to vascular endothelial cells, such as cyclophosphamide, capecitabine, and 5-fluoro may be evaluated. Furthermore, through the cardiac organoid according to an exemplary embodiment of the present disclosure in which the ventricle has been identified by the expression of MYL2 as the ventricle identification marker, drugs causing ventricular dysfunction, such as mitoxantrone, ifosfamide, and sunitinib, may be evaluated. As described above, since the cardiac organoid according to an exemplary embodiment of the present disclosure includes both the functional and structural elements of the heart, toxicity and efficacy of various drugs may be evaluated.

First, in the reacting of the cardiac organoid with the drug (S110), the cardiac organoid according to an exemplary embodiment of the present disclosure reacts with the drug on a plate for 15 to 60 minutes.

In this case, the term "drug" as used herein may include all materials used to change or examine a physiological system or disease conditions for the benefit of living things. More specifically, the drug may include at least one of the group consisting of vitamins, hormones, metal salts, vaccines, antiserum agents, antibiotics, chemotherapeutic agents, cardiac agents, blood pressure regulators, antihistamines, steroids, antitoxins and contrast agents, but is not limited thereto.

Thereafter, the cardiac organoid after the drug reaction is completed is washed (S120), and the washed cardiac organoid is cultured (S130). At this time, in culture environment conditions, the temperature may be 36° C. to 38° C., preferably 36.5° C. to 37.5° C., supply oxygen ($O_2$) may be 1% to 25%, supply carbon dioxide ($CO_2$) may be 1% to 15%, and the culture time may be 30 to 90 minutes, but the present disclosure is not limited thereto.

Next, the evaluation of drug toxicity using the cardiac organoid according to an exemplary embodiment of the present disclosure may include capturing images of the reaction, washing and culturing described above (S140), obtaining the captured images (S150) and analyzing the obtained images (S160).

At this time, in the capturing of the images of the reaction, washing and culturing (S140), the obtaining of the captured images (S150) and the analyzing of the obtained images (S160), Cellogy pulse analysis was used. The analyzing method through the captured images may refer to a method of measuring a difference in the amount of change in pixel values between a cell area and a background area in continuously captured images, but is not limited thereto.

The drug toxicity using the cardiac organoid according to an exemplary embodiment of the present disclosure may be evaluated by measuring variation of the cardiac organoid by the drug by various electric devices capable of measuring the temperature, nerve activity, conductance, pressure, ions and the like of the cardiac organoid as well as the analyzing method through the captured images.

On the other hand, by the above-described method, it is possible to evaluate the cardiac toxicity and efficacy of various drugs. For example, referring to FIGS. 13A to 13D, results for evaluating drug toxicity and efficacy by using the cardiac organoid according to an exemplary embodiment of the present disclosure are illustrated.

Figure 13A:
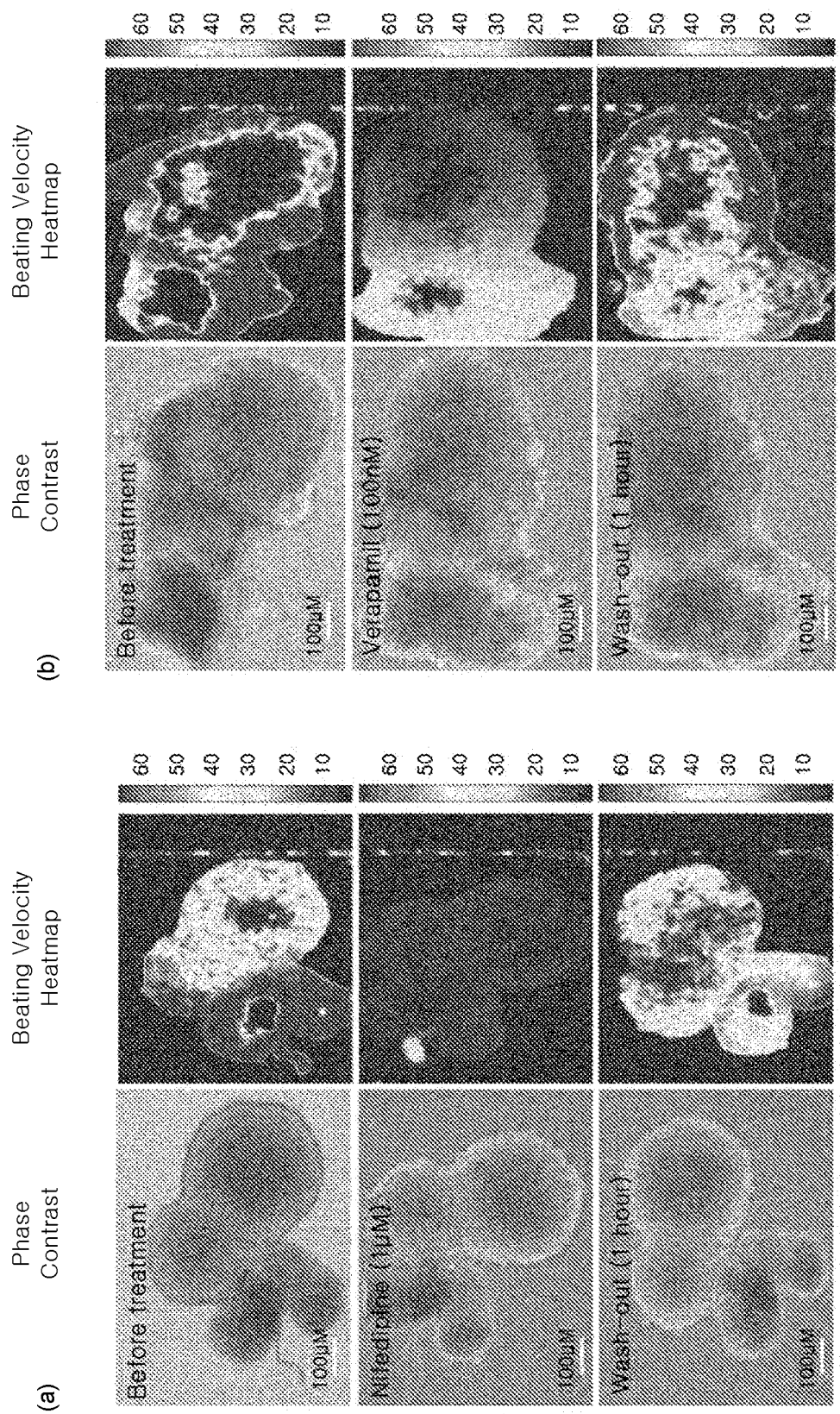
FIGS. 13A to 13D illustrate results for evaluating drug toxicity and efficacy by using the cardiac organoid according to an exemplary embodiment of the present disclosure.
Figure 13B:
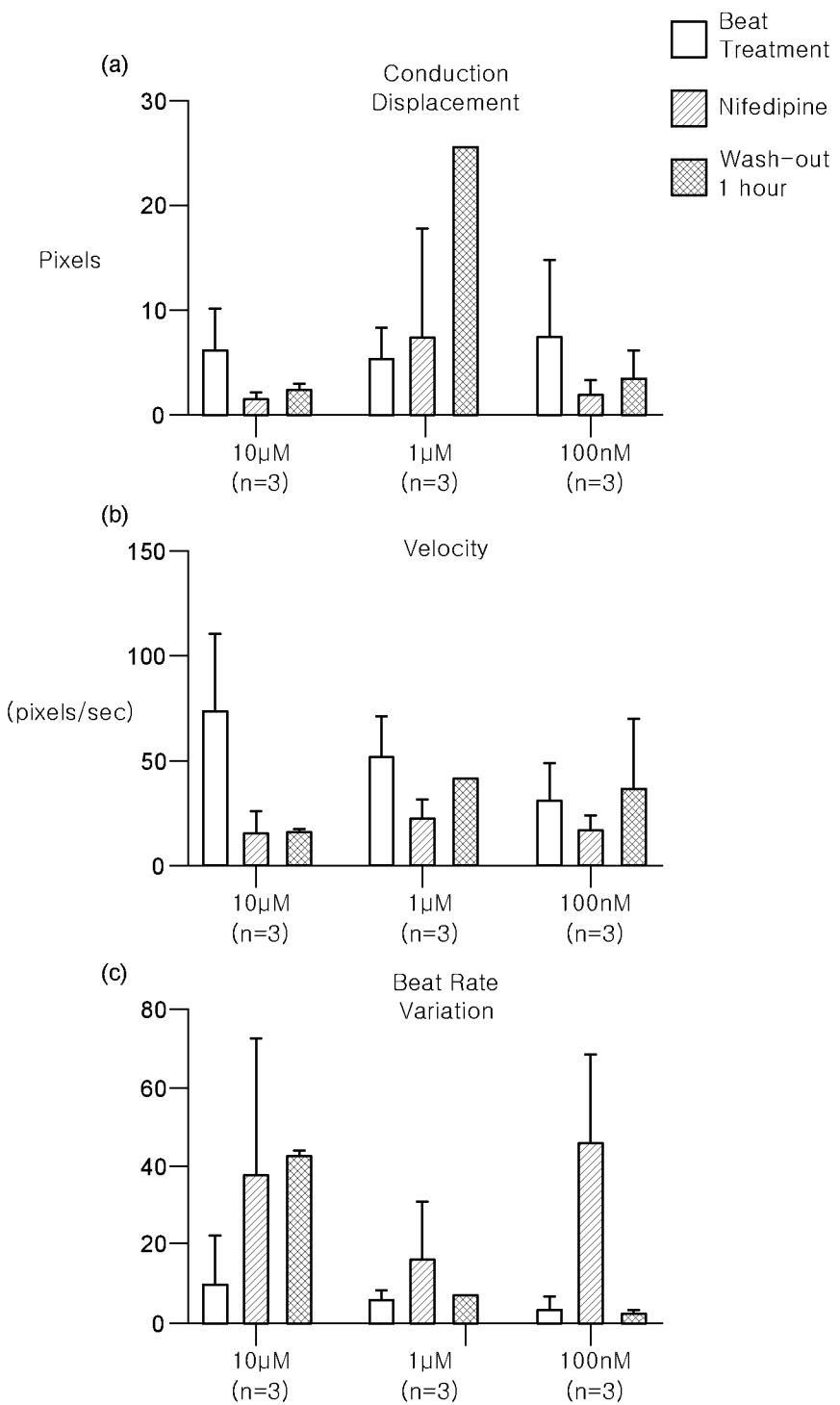

Referring to FIG. 13A, images, heat maps for beating velocity according to treatment with a calcium antagonist of the cardiac organoid according to an exemplary embodiment of the present disclosure are shown. In the cardiac organoid, a calcium channel is blocked by nifedipine and verapamil, so that the beating velocity is reduced, and after washing and culturing for 1 hour, the beating velocity is again increased.

This may mean that the cardiac organoid according to an exemplary embodiment of the present disclosure may exhibit the effect of the calcium antagonist for treatment of hypertension and arrhythmias in the same response as the living heart. Furthermore, referring to FIG. 13B, results showing conduction displacement, beating velocity, and beat rate variation of the cardiac organoid according to a treatment amount of nifedipine are illustrated. In this case, the conduction displacement may evaluate abnormality in electrical signals of the heart, and a change in the heart may be expressed as a change in beating velocity. Furthermore, the beat rate variation may mean the ability of the heart to adapt to unexpected stimuli, and may evaluate a health condition of the heart and a condition of the autonomic nervous system that regulates heart activity.

First, in the conduction displacement before nifedipine treatment, a 100 nM group was highest, and even in the conduction displacement after nifedipine treatment, the 100 nM group was highest. However, the conduction displacement after washing is similar in all of the three groups. Furthermore, the velocity before nifedipine treatment was also highest in the 100 nM group, the velocity after nifedipine treatment was also highest in the 100 nM group, and the velocities after washing were similar in all of the three groups. This may be a difference due to a difference in contractility according to each group.

However, the beat rate variation before nifedipine treatment was similar in all of the three groups, but the beat rate variation after nifedipine treatment was highest in a 10 µM treatment group and lowest in a 100 nM treatment group, and as the treatment amount of nifedipine increases, it is illustrated that the beat rate variation increases proportionally. This may mean that as the drug treatment amount of nifedipine increases, the cardiac organoid performs abnormally fast contraction, such as arrhythmia of the living heart. Therefore, it can be inferred that nifedipine may cause side effects in the heart in vivo when the treatment amount is 10 µM or more. Furthermore, it may be meant that the cardiac organoid may imitate electrical lesion shown in the living heart.

Figure 13C:
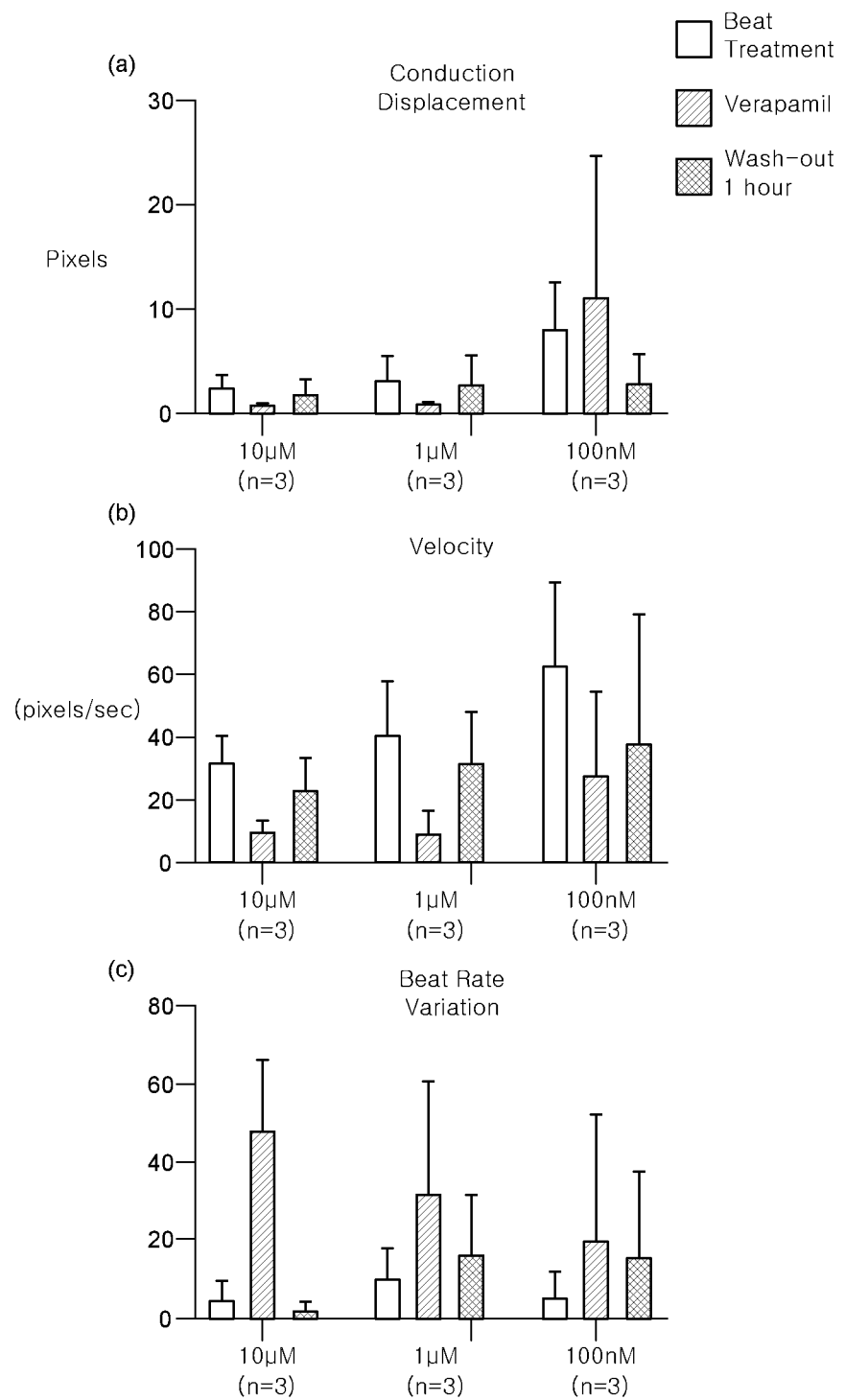

Further, referring to FIG. 13C, results showing conduction displacement, beating velocity, and beat rate variation of the cardiac organoid according to a treatment amount of verapamil are illustrated.

First, the conduction displacement before verapamil treatment was similar in all of the three groups, and the conduction displacement after treatment was highest in a 1 µM group. Furthermore, the conduction displacement after washing is also highest in the 1 µM group. Furthermore, the velocity before nifedipine treatment was highest in the 10 µM group, and the velocities after treatment and after washing were similar in all of the three groups.

However, the beat rate variation before verapamil treatment is similar in all of the three groups, but the beat rate variation after verapamil treatment is similar in both 10 µM and 100 nM groups and higher than that of the 1 µM group, and the beat rate variation after washing is highest in the 10 µM group. This may mean that, in the case of verapamil, the cardiac organoid exhibits abnormally fast contraction such as arrhythmias in the heart even at a low drug treatment amount. Therefore, it can be inferred that verapamil may cause side effects in the heart in vivo in the case of 100 nM or more, and it may be meant that the drug toxicity of the heart is higher than that of nifedipine described above.

Figure 13D:
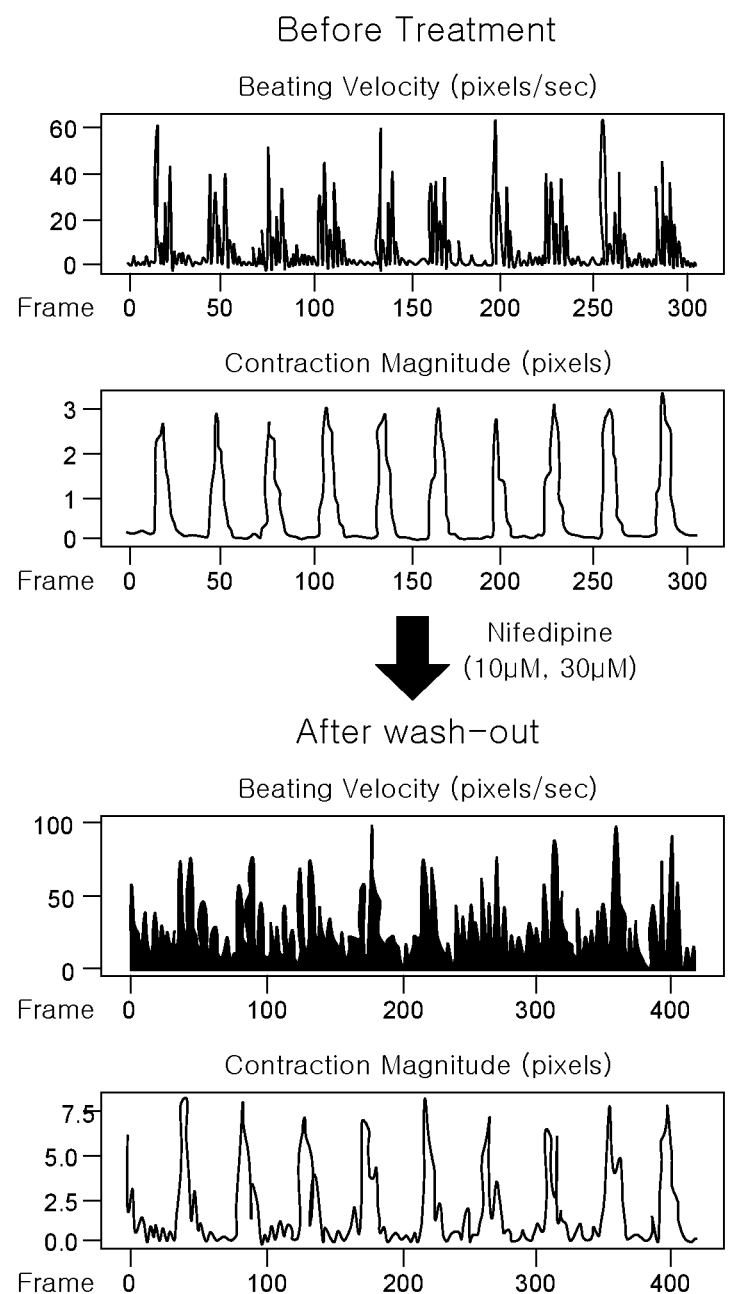

In addition, referring to FIG. 13D, results for the contraction of the cardiac organoid according to 10 µM nifedipine treatment are illustrated. More specifically, the cardiac organoid before nifedipine treatment has a magnitude of 50 to 60 pixels in contraction and a magnitude of 30 to 40 pixels in relaxation, and a beating velocity once every 25 frames, and the contraction magnitude has a magnitude of 2 to 3 pixels once every 25 frames. However, the cardiac organoid after nifedipine treatment has a magnitude of 50 to 100 pixels in contraction and a magnitude of 40 to 80 pixels in relaxation, and a beating velocity several times every 25 frames, and the contraction magnitude has a magnitude of 5 to 7.5 pixels once every 50 frames.

That is, the cardiac organoid before nifedipine treatment showed uniform contraction and relaxation, whereas the cardiac organoid after nifedipine treatment showed sporadic contraction and relaxation. This may mean that nifedipine may cause side effects such as arrhythmias with a sporadic beating rate in a normal heart.

Through Example 3 above, the evaluation of drug toxicity using the cardiac organoid according to an exemplary embodiment of the present disclosure may evaluate side effects, toxicity and efficacy of the drug. Furthermore, the evaluation of drug toxicity using the cardiac organoid according to an exemplary embodiment of the present disclosure may predict a dose and adaptability of a drug for each patient, and determine an effective dose of the drug in developing a new drug.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be appreciated that the aforementioned exemplary embodiments are illustrative in all aspects and are not restricted. The protective scope of the present disclosure should be construed based on the appended claims, and all the technical spirits in the equivalent scope thereof should be construed as falling within the scope of the present disclosure.

The invention claimed is:

1. A manufacturing method of a cardiac organoid, the method comprising:
   a first culturing step of differentiating pluripotent stem cells (PSCs) into cardiomyocytes (CMs);
   a second culturing step of culturing the cardiomyocytes and an extracellular matrix (ECM) in a first maintenance medium so as to form a fusion tissue; and
   a third culturing step of culturing the fusion tissue in a second maintenance medium so as to form a cardiac organoid.

2. The manufacturing method of the cardiac organoid of claim 1, wherein the second maintenance medium contains insulin.

3. The manufacturing method of the cardiac organoid of claim 1, wherein the first culturing step comprises
   seeding pluripotent stem cells;
   maintaining the seeded pluripotent stem cells in the first maintenance medium;
   culturing the pluripotent stem cells in an induction medium so that the pluripotent stem cells are induced into cardiac progenitors through a mesoderm cell stage; and
   culturing the mesoderm cells in the first maintenance medium to differentiate the cardiac progenitors into mature cardiomyocytes.

4. The manufacturing method of the cardiac organoid of claim 3, wherein the induction medium includes at least one of the group consisting of IWR-1 endo, XAV-939, JW74, SEN461, ICG-001, LGK-974, IWP-2, IWP-4, Wnt-C59 and WIKI4.

5. The manufacturing method of the cardiac organoid of claim 3, wherein the culturing of the pluripotent stem cells in the induction medium is performed for at least one period of 5 to 7 days.

6. The manufacturing method of the cardiac organoid of claim 3, wherein the culturing of the cardiac progenitors in the first maintenance medium is performed for at least one period of 10 to 21 days.

7. The manufacturing method of the cardiac organoid of claim 1, wherein the first maintenance medium does not contain insulin.

8. The manufacturing method of the cardiac organoid of claim 1, wherein the extracellular matrix is obtained from fibroblast.

9. The manufacturing method of the cardiac organoid of claim 1, wherein the second culturing step is performed for at least one period of 28 to 32 days.

10. The manufacturing method of the cardiac organoid of claim 1, wherein the third culturing step comprises
cutting the fusion tissue, and
suspension-culturing the cut fusion tissue.

11. A spontaneous-contracting cardiac organoid comprising:
a chamber in which a fluid is stored;
a first pipe (track) connected to the chamber so that the fluid flows therethrough;
a second pipe connected to the chamber so that the fluid is discharged therethrough; and
a valve formed on the first pipe to spontaneously open/close an inflow pipe.

12. The spontaneous-contracting cardiac organoid of claim 11, wherein the chamber expresses TUBB3, TNNT2, PECAM1 and MYL2.

13. The spontaneous-contracting cardiac organoid of claim 11, wherein in the chamber, trabeculated cardiomyocytes are formed toward an inner pipe of the chamber.

14. The spontaneous-contracting cardiac organoid of claim 11, wherein the chamber is formed with calcium transients.

15. A method for evaluating drug toxicity by using a cardiac organoid, the method comprising:
reacting the cardiac organoid of claim 11 with a drug;
washing the cardiac organoid after the drug reaction is completed;
culturing the washed cardiac organoid;
capturing images of the reacting, washing and culturing;
obtaining the captured images; and
analyzing the obtained images.

16. The method of claim 15, wherein the analyzing of the images is performed based on a difference in amount of change of pixel values between a cell area and a background area in images continuously captured during contraction of the cardiac organoid.

17. The method of claim 15, wherein the analyzing of the images is performed by measuring conduction displacement, beat rate variation, and beating velocity.

* * * * *